US012624756B2

(12) United States Patent
Kim et al.

(10) Patent No.: US 12,624,756 B2
(45) Date of Patent: May 12, 2026

(54) SHIFT-BY-WIRE TRANSMISSION SYSTEM

(71) Applicants: Hyundai Motor Company, Seoul (KR); Kia Corporation, Seoul (KR); LS Automotive Technologies Co., Ltd., Anyang-si (KR)

(72) Inventors: Bum Jun Kim, Siheung-Si (KR); Kyeong Hwan Choi, Ulsan (KR); Sung Won Cho, Yongin-Si (KR); Won Lee, Siheung-Si (KR); In Hyuk Im, Seoul (KR)

(73) Assignees: Hyundai Motor Company, Seoul (KR); Kia Corporation, Seoul (KR); LS Automotive Technologies Co., Ltd., Anyang-si (KR)

( * ) Notice: Subject to any disclaimer, the term of this patent is extended or adjusted under 35 U.S.C. 154(b) by 305 days.

(21) Appl. No.: 18/384,284

(22) Filed: Oct. 26, 2023

(65) Prior Publication Data

US 2024/0295263 A1 Sep. 5, 2024

(30) Foreign Application Priority Data

Mar. 3, 2023 (KR) ........................ 10-2023-0028548

(51) Int. Cl.
| | |
|---|---|
| *F16H 59/08* | (2006.01) |
| *F16H 59/12* | (2006.01) |
| *G05G 5/03* | (2008.04) |
| *G05G 5/05* | (2006.01) |

(52) U.S. Cl.
CPC ............... *F16H 59/08* (2013.01); *G05G 5/03* (2013.01); *G05G 5/05* (2013.01); *F16H*

*2059/081* (2013.01); *F16H 59/12* (2013.01); *G05G 2505/00* (2013.01)

(58) Field of Classification Search
CPC .... F16H 59/08; F16H 59/12; F16H 2059/081; G05G 5/03; G05G 5/05; G05G 2505/00
USPC ........................................................ 74/473.3
See application file for complete search history.

(56) References Cited

U.S. PATENT DOCUMENTS 10,100,919 B1     10/2018     Turney et al.

FOREIGN PATENT DOCUMENTS

| | | | |
|---|---|---|---|
| JP | 2013-124068 | | 6/2013 |
| KR | 20130130109 A | * | 12/2013 |
| KR | 10 2022 0142636 | | 10/2020 |
| KR | 10 2021 0111402 | | 9/2021 |
| KR | 10 2021 0156820 | | 12/2021 |
| KR | 10 2022 0039272 | | 3/2022 |

(Continued)

*Primary Examiner* — T. Scott Fix
(74) *Attorney, Agent, or Firm* — MORGAN, LEWIS & BOCKIUS LLP

(57) ABSTRACT

A shift-by-wire transmission system includes a gear shifting operation portion provided at an end portion of a body and configured to shift a gear, a housing provided inside the body, a haptic element provided in contact with the housing and configured to generate a vibration when the gear is shifted to a predetermined gear shifting stage to transmit the vibration to the housing, and a groove member coupled to the gear shifting operation portion and configured to operate in conjunction with a gear shifting operation of the gear shifting operation portion and transmit the vibration of the haptic element, which is transmitted to the housing, to the gear shifting operation portion by constantly maintaining a state in contact with the housing.

18 Claims, 21 Drawing Sheets

(56)         References Cited

FOREIGN PATENT DOCUMENTS

| KR | 10 2022 0070931 | 5/2022 |
| KR | 10-2024-0135242 | 9/2024 |
| KR | 10-2024-0135243 | 9/2024 |

* cited by examiner

FIG. 3 axial direction

A

A

B

B

210

210a

100

110

130 vibration direction
of gear shift knob

FIG. 4 one end the other end 100
120
110
130
440
410
290
250
210
220
230
240
260
270
280
300
400
420
430

FIG. 6 vibration direction
of haptic element

SHIFT-BY-WIRE TRANSMISSION SYSTEM

CROSS REFERENCE TO RELATED APPLICATION

The present application claims priority to Korean Patent Application No. 10-2023-0028548 filed on Mar. 3, 2023, the entire contents of which is incorporated herein for all purposes by this reference.

BACKGROUND OF THE PRESENT DISCLOSURE

Field of the Present Disclosure

The present disclosure relates to a shift-by-wire transmission system that improves recognition performance of a gear shifting operation by generating a vibration at a part of the gear shifting operation when a driver shifts a gear to a predetermined gear shifting stage.

Description of Related Art

A conventional transmission system is provided in a center portion of a console and is broadly divided into a shift-by-cable type transmission system and a shift-by-wire type transmission system.

Recently, there is a tendency to expand and apply the shift-by-wire transmission system rather than the shift-by-cable transmission system. This is because the shift-by-wire transmission system has a greater degree of freedom in design of a mounting position and improved operation convenience compared to the shift-by-cable transmission system.

Meanwhile, when a driver operates a transmission system to shift a gear to an R stage, the driver can visually recognize a state in which the gear shifting enters the R stage through an indicator function using a lamp and can audibly recognize the state through a beep sound.

However, because there is a high probability that with a recognition function based on visual sense or auditory sense, the driver fails to clearly recognize whether an indicator is turned on or hear a beep sound due to the surrounding environment of a vehicle, there is an additional demand for a function that allows the driver to intuitively recognize that the gear shifting enters the R stage.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a shift-by-wire transmission system that improves recognition performance of a gear shifting operation by generating a vibration at a portion of a gear shifting operation when a driver operates a gear shifting to a predetermined gear shifting stage.

The technical problems to be solved by the present disclosure are not limited to the above-mentioned technical problems and other technical problems which are not mentioned may be clearly understood by those skilled in the art to which the present disclosure pertains from the following description.

According to one aspect, there is provided a shift-by-wire transmission system including a gear shifting operation portion provided at an end portion of a body and configured to shift a gear, a housing provided inside the body, a haptic element provided in contact with the housing and configured to generate a vibration when the gear is shifted to a predetermined gear shifting stage to transmit the vibration to the housing, and a groove member coupled to the gear shifting operation portion, configured to operate in conjunction with a gear shifting operation of the gear shifting operation portion and transmit the vibration of the haptic element, which is transmitted to the housing, to the gear shifting operation portion.

An element groove may be formed in the housing, and the haptic element may be inserted into the element groove to be in contact with the housing.

The element groove may be integrally formed on one side of an external circumferential surface of the housing.

The haptic element may be bonded to a bottom surface of the element groove.

A gap formation rib may be formed to protrude from a sidewall of the element groove so that the haptic element may be supported on the gap formation rib.

The housing may be assembled on one surface of an internal side of the body, an opening may be formed at an end portion of the element groove facing a bottom surface of the element groove, and the haptic element may be inserted into the opening, and an element fixing rib may be formed to protrude from the other surface of the internal side of the body toward the end portion of the element groove and may support the haptic element.

The housing may be formed in a shape of cylinder and coupled to an internal surface of the body by the medium of an engagement member.

A housing support rib may be formed on an internal surface of the body facing the housing to support an external surface of the housing.

The shift-by-wire transmission system may further include a gear shifting knob provided at the end portion of the body as the gear shifting operation portion and rotated about an axis of the body, and the groove member may be inserted into and coupled to inside of the gear shifting knob.

A hook may be formed on an external surface of the groove member, and a hook groove including a shape corresponding to the hook may be formed on an internal surface of the gear shifting knob so that the groove member may be engaged with the gear shifting knob by snap-fitting between the hook and the hook groove.

A position fixing rib may be formed to protrude from an internal surface of the gear shifting knob in an axial direction of the body, and a position fixing groove including a shape corresponding to the position fixing rib may be formed on an external surface of the groove member so that the position fixing rib may be inserted into the position fixing groove.

The shift-by-wire transmission system may further include a restoration portion elastically supported between the housing and the groove member to be provided in a state of constantly being in contact with therebetween and configured to provide an elastic restoring force for a rotational operation of the groove member according to a rotational gear shifting operation of the gear shifting operation portion.

The restoration portion may include a gear shifting groove formed at an end portion of the groove member in a groove shape along a path in which the groove member is rotated, a bullet groove formed in the housing, a bullet movably inserted into the bullet groove and supported on the gear shifting groove, and a return spring configured to provide an elastic restoring force to the bullet in a direction toward the gear shifting groove.

The return spring may be in contact with the housing, the bullet in contact with the return spring may maintain a state of constantly being in contact with the groove member, the vibration generated from the haptic element may be transmitted to the housing, and the vibration transmitted to the housing may be transmitted to the groove member by the medium of the restoration portion.

The bullet groove may be formed in the axial direction of the body so that an opening of the bullet groove may be formed to face the gear shifting groove, and the return spring may be supported between an end portion of an internal side of the bullet groove and the bullet.

An end portion of the housing may be inserted into an end portion of the groove member with a small gap at a level capable of transmitting a vibration so that the vibration generated from the haptic element may be transmitted from the housing to the groove member.

A cylindrical housing insertion portion may be formed at one end portion of the housing toward the groove member, and a cylindrical groove insertion portion may be formed at one end portion of the groove member toward the housing so that an external circumferential surface of the housing insertion portion may be inserted into an internal circumferential surface of the groove insertion portion with a small gap.

A grip surface configured held by fingers during a gear shifting operation may be formed on a surface of the gear shifting operation portion, and the haptic element may be disposed so that the vibration generated from the haptic element may be transmitted in a direction horizontal to the grip surface.

The grip surface may be formed in a direction parallel to an axial direction of the body, a vibrating surface formed on a side surface of the haptic element may be in contact with the housing to transmit the vibration, and the vibrating surface may be disposed in a direction parallel to the axial direction of the body and in a direction perpendicular to the grip surface.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 is a diagram illustrating the external appearance of the shift-by-wire transmission system according to an exemplary embodiment of the present disclosure when viewed from the top portion and a state in which a gear shifting knob is gripped;

FIG. 4 is a cross-sectional view taken along line A-A of FIG. 3;

FIG. 6 is a diagram illustrating an operation in which a distance to a sensor is changed by linearly moving a magnet according to an exemplary embodiment of the present disclosure;

Figure 12:
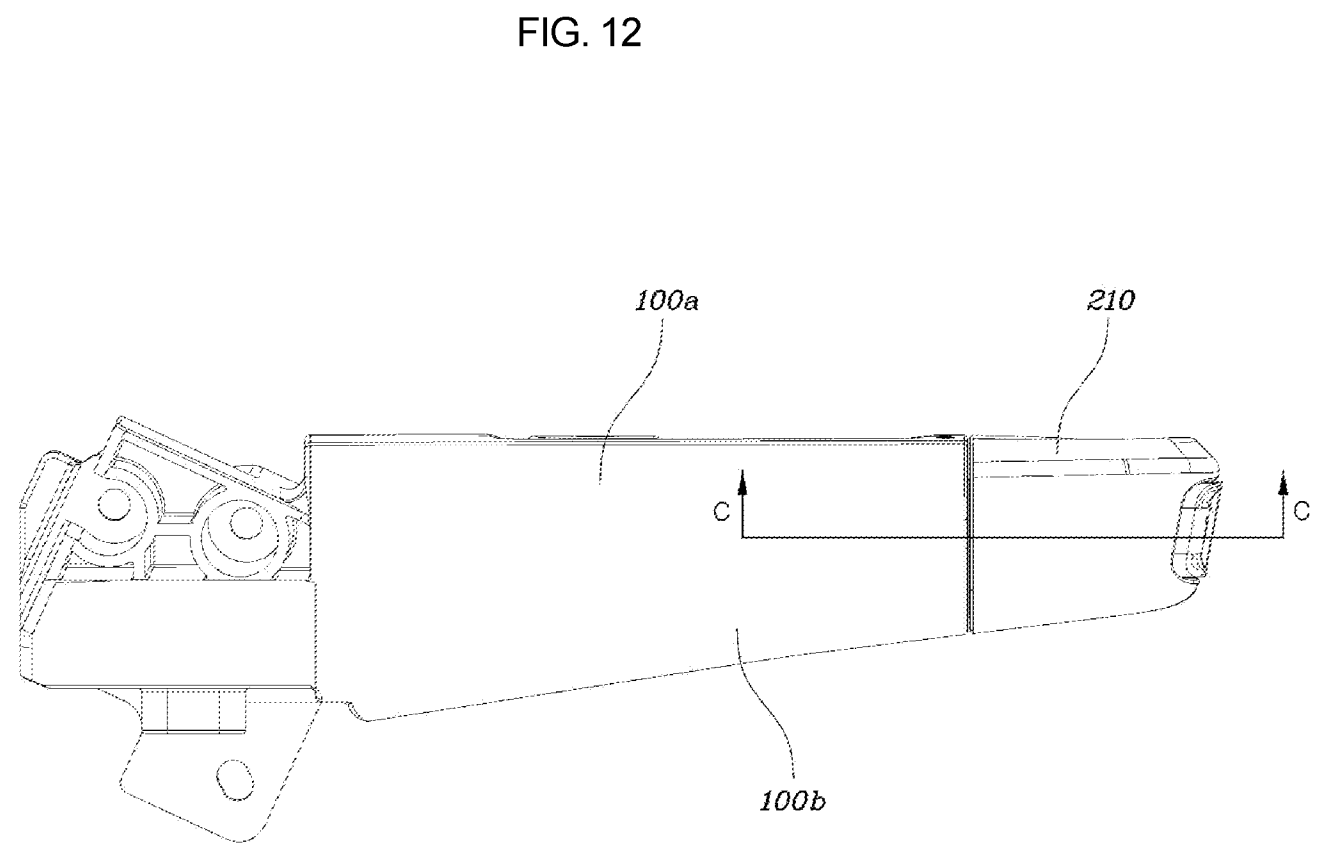

FIG. 12 is a diagram illustrating the external appearance of a shift-by-wire transmission system when viewed from the side according to an exemplary embodiment of the present disclosure;

FIG. 14 is a diagram illustrating a coupling relationship between a groove member and a moving restoring member according to an exemplary embodiment of the present disclosure;

FIG. 19 is a diagram illustrating a shape of the gear shifting groove according to an exemplary embodiment of the present disclosure;

FIG. 20 is a diagram for describing an operation of shifting a gear to an N stage Nd and a D stage according to a rotation in one direction and a rotation angle of the magnet according to an exemplary embodiment of the present disclosure.

Figure 1:
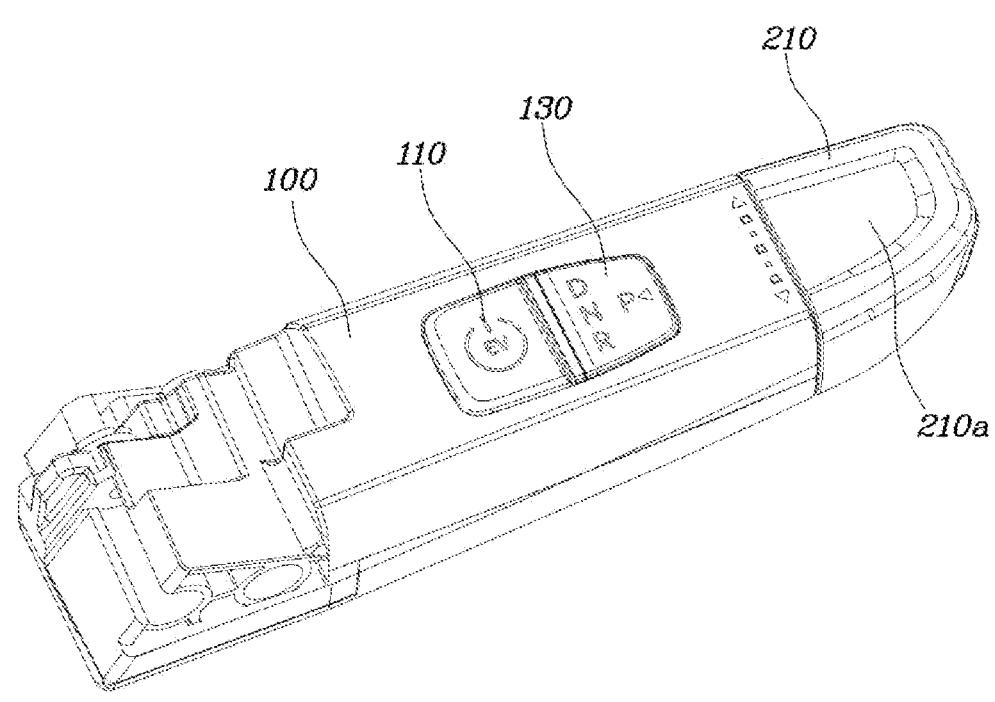
FIG. 1 is a diagram illustrating an external appearance of a shift-by-wire transmission system according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the drawings. The same reference numerals are provided to the same or similar components regardless of reference numerals, and a repetitive description thereof will be omitted.

As used herein, suffixes "module" and "portion" for a component of the present disclosure are used or interchangeably used solely for ease of preparation of the specification, and do not have different meanings and each thereof does not function by itself.

In the following description of the present specification, when a detailed description of a known related art is determined to obscure the gist of the present specification, the detailed description thereof will be omitted herein. Furthermore, the accompanying drawings are merely for easy understanding of the exemplary embodiments included in the present specification, the technical spirit included in the present specification is not limited by the accompanying drawings, and it should be understood to include all modifications, equivalents, and substitutes included in the spirit and scope of the present disclosure.

Terms including ordinal numbers such as first, second, and the like used herein may be used to describe various components, but the various components are not limited by these terms. The terms are used only for distinguishing one component from another component.

When a component is referred to as being "connected" or "coupled" to another component, the component may be directly connected or coupled to another component, but it should be understood that sill another component may be present between the component and another component. On the other hand, when a component is referred to as being "directly connected" or "directly coupled" to another component, it should be understood that yet another component may not be present between the component and another component.

Unless the context clearly dictates otherwise, the singular form includes the plural form.

In the present specification, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

A controller may include a communication device configured for communicating with other controllers or sensors to control a responsible function, a memory for storing an operating system, a logic command, and input/output information, and one or more processors for performing determination, calculation, and decision which are necessary for controlling the responsible function.

A shift-by-wire transmission system of the present disclosure may be provided at a position where a gear shifting operation is possible without interference of a seat in an autonomous vehicle in which the seat is freely moved and deformed. As an exemplary example, the shift-by-wire transmission system may be provided on a side surface of a steering column.

The shift-by-wire transmission system includes a body 100, an operation part assembly 200, and a controller 400.

Referring to FIGS. 1 to 7, the body 100 is first provided in a direction perpendicular to the side surface of the steering column, and an upper body 100*a* and a lower body 100*b* are assembled, and the body 100 is formed in a container shape elongated in a longitudinal direction to fix and support parts therein.

A printed circuit board (PCB) is provided inside the body 100 as the controller 400, and the PCB includes a main PCB 400*a* and a sub-PCB 400*b*.

A sensor 410 for detecting a magnet 280 is connected to the sub-PCB 400*b*, and the main PCB 400*a* and the sub-PCB 400*b* are connected by wiring so that a signal detected by the sensor 410 may be input to the main PCB 400*a*. For reference, a haptic element 340, which will be described below, may be connected to the main PCB 400*a* through wiring.

Furthermore, pinholes 401 are formed on edge portions of the main PCB 400*a* and the sub-PCB 400*b*, and fixing pins 101 are formed to protrude in a shape corresponding to the pinholes 401 from an internal surface of the upper body 100*a* so that the fixing pins 101 is inserted into and coupled to the pinholes 401.

Furthermore, a controller support rib 105 is formed to protrude from the internal surface of the upper body 100*a* facing the main PCB 400*a* and sub-PCB 400*b* and is supported on the main PCB 400*a* and sub-PCB 400*b*.

Furthermore, according to the specifications of the sensor 410 (a dual die and a single die), the sensor 410 may be provided as a single sensor 410 or a plurality of sensors 410 at a position corresponding to the magnet 280. In an exemplary embodiment of the present disclosure, a plurality of single die magnetic sensors are disposed at the rotation center portion of the magnet 280 so that a magnetic force measurement error may be reduced and the magnet 280 may be miniaturized.

This sensor 410 detects R/N/D stage gear shifting operations and a P stage gear shifting operation through the gear shifting operation portion, and when a signal detected by the sensor 410 is input, the controller 400 may be configured for controlling a gear to be shifted to a gear shifting stage corresponding to the detected gear shifting operation.

Because the operation part assembly 200 is provided in an axial direction of the body 100 and the magnet 280 is provided in the operation part assembly 200, the magnet 280 is rotated with a rotation of the operation part assembly 200 so that a magnetic force of the magnet 280 detected by the sensor 410 varies.

Furthermore, the magnet 280 is moved together with a movement operation of the operation part assembly 200 so that the magnetic force of the magnet 280 detected by the sensor 410 varies.

As an exemplary embodiment of the present disclosure, the gear shifting operation portion includes a gear shifting knob 210 and a gear shifting button 220, and when the gear shifting knob 210 is rotated, the gear shifting operation portion shifts a gear to a gear shifting stage, excluding the P stage, according to a rotational operation and a rotation direction of the gear shifting knob 210.

The gear shifting stage, excluding the P stage, may be an R stage, an N stage, or a D stage. When the gear shifting knob 210 is rotated in one direction, the gear is shifted to the D stage, and when the gear shifting knob 210 is rotated in another direction, the gear is shifted to the R stage, and before the gear is shifted to the D stage or the R stage by the rotation of the gear shifting knob 210 in one direction or another direction, the gear is shifted to the N stage at an Nd or Nr position.

Furthermore, when the gear shifting button 220 is pressed, the gear shifting button 220 is linearly moved toward the inside of the body 100 with respect to the gear shifting knob 210 to shift the gear to the P stage. In the instant case, the gear shifting knob 210 is positioned at a neutral position.

As described above, according to an exemplary embodiment of the present disclosure, the transmission system is provided in the column, the variation of the magnetic force of the magnet 280 according to the rotational operation and pressing operation of the gear shifting operation portion is detected through the sensor 410 to shift the gear shifting stage so that the gear shifting operation may be performed rapidly and accurately and convenience of the gear shifting operation may be improved.

Meanwhile, in the shift-by-wire transmission system according to an exemplary embodiment of the present disclosure, when the driver manipulates the gear shifting operation portion to enter the R stage, a vibration is generated in the gear shifting operation portion so that the driver holding the gear shifting operation portion may recognize the entering of the gear shifting by a tactile sense.

To the present end, as an exemplary example, the shift-by-wire transmission system includes the gear shifting operation portion provided at an end portion of the body 100 and configured to shift a gear, a housing 300 provided inside the body 100, a haptic element 340 provided in contact with the housing 300 and configured to generate a vibration when the gear is shifted to a predetermined gear shifting stage to transmit the vibration to the housing 300, and a groove member 250 coupled to the gear shifting operation portion and configured to operate in conjunction with a gear shifting operation of the gear shifting operation portion and transmit the vibration of the haptic element 340, which is transmitted to the housing 300, to the gear shifting operation portion by constantly maintaining a state in contact with the housing 300.

The gear shifting operation portion is the gear shifting knob 210 which shifts a gear to the R stage, and the gear shifting knob 210 may be rotated in one direction based on the axial direction of the body 100 to enter the gear shifting to the R stage.

Furthermore, the housing 300 is coupled within the body 100.

The housing 300 is formed in a shape of cylinder and coupled to an internal surface of the body 100 by the medium of an engagement member. The engagement member may be a screw.

Furthermore, housing support ribs 104 are formed on the internal surfaces of the upper body 100a and lower body 100b facing the housing 300, and the housing support ribs 104 are supported on an external surface of the housing 300 so that the housing 300 is securely assembled within the body 100.

Furthermore, because the housing support rib 104 is in line contact with the housing 300, the vibration of the haptic element 340 transmitted to the body 100 is minimized and the housing 300 is securely fixed to the body 100.

Furthermore, because the vibration of the haptic element 340 transmitted to the body 100 is minimized, the vibration is more efficiently transmitted to the gear shifting knob 210 and an influence on durability of the PCB and an indicator, which are fixed to the body 100, is minimized.

The haptic element 340 is connected to the controller 400 to receive power and a signal and is operated to generate a vibration when entering the R stage.

Because the haptic element 340 is fixed to the housing 300, the vibration generated from the haptic element 340 is transmitted to the housing 300.

Furthermore, the groove member 250 is disposed in the operation part assembly 200 and is coupled to the gear shifting knob 210 to be rotated with a rotational manipulation of the gear shifting knob 210.

Furthermore, the groove member 250 maintains a state of being in constant contact with the housing 300 by a restoration portion, which will be described below, together with a structure inserted into the housing 300 and forms a gear shifting operation feeling during a gear shifting operation according to the rotation of the gear shifting knob 210 to form a gear shifting profile.

Thus, when the driver manipulates the gear shifting knob 210 to shift the gear to the R stage, the vibration generated by the haptic element 340 is transmitted to the housing 300, and then the vibration transmitted to the housing 300 is transmitted to the driver through the groove member 250 and the gear shifting knob 210 so that the driver may more clearly recognize that the gear shifting operation is performed to the R stage.

Figure 7:
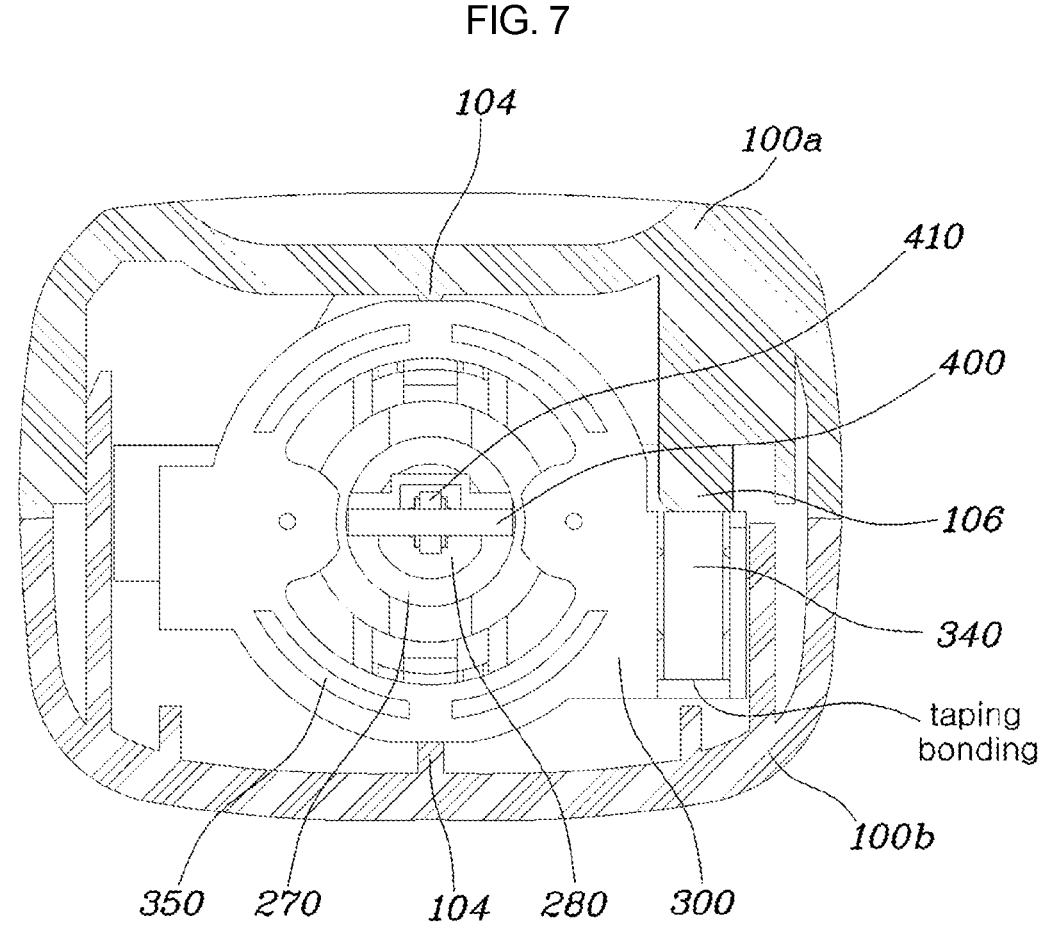
FIG. 7 is a cross-sectional view taken along line B-B of FIG. 3.
Figure 8:
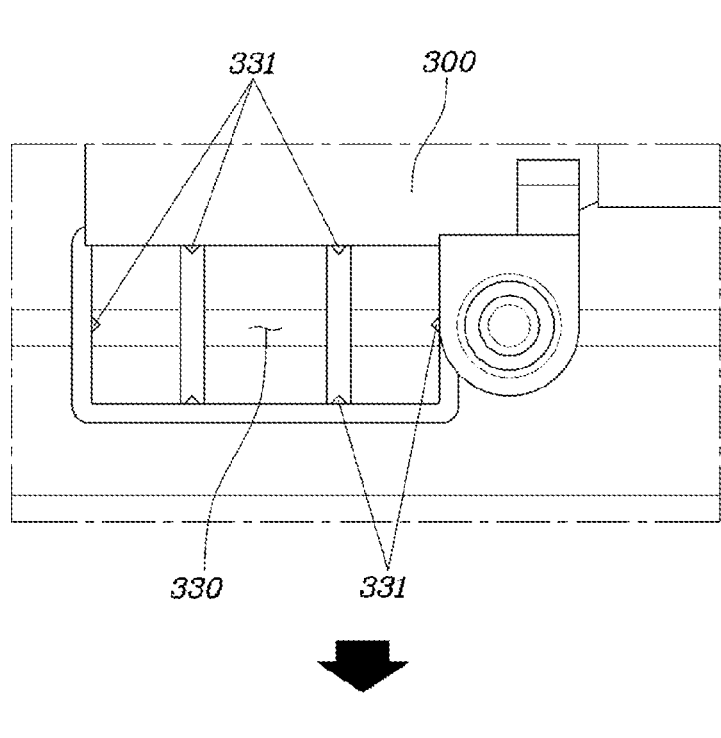
FIG. 8 is a diagram illustrating states before and after a haptic element is inserted into an element groove according to an exemplary embodiment of the present disclosure.
Figure 8:
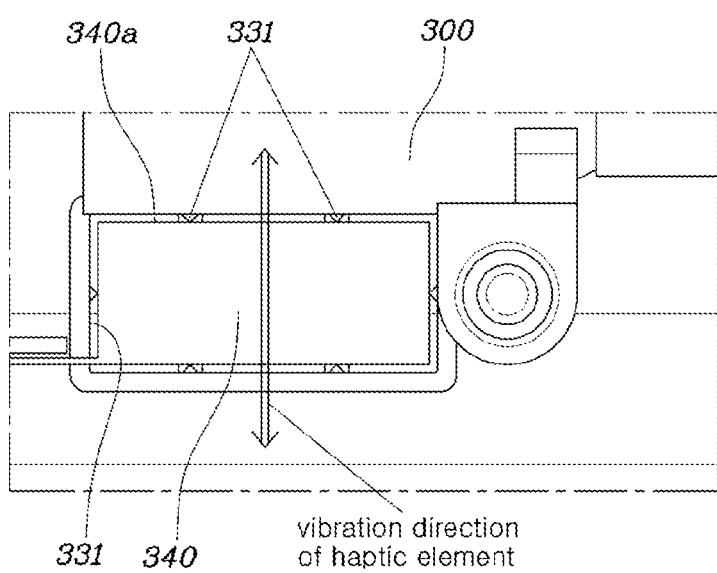

Furthermore, as shown in FIGS. 7 and 8, in an exemplary embodiment of the present disclosure, an element groove 330 is formed in the housing 300, and the haptic element 340 is inserted into the element groove 330 so that the haptic element 340 may be in contact with the housing 300.

That is, the element groove 330 is integrally formed in a quadrangular groove shape on one side of an external circumferential surface of the housing 300, and the haptic element 340 is formed in a quadrangular block shape corresponding to the shape of the element groove 330 so that the haptic element 340 is inserted into the element groove 330.

Thus, the vibration of the haptic element 340 may be more efficiently transmitted to the housing 300, and the haptic element 340 may be more compactly packaged in the housing 300.

Furthermore, the haptic element 340 may be bonded to a bottom surface of the element groove 330.

For example, taping treatment is performed on the bottom surface of the element groove 330, and thus a lower end portion of the haptic element 340 is tape-bonded to the bottom surface of the element groove 330 so that the haptic element 340 is fixed within the element groove 330 without a complicated coupling structure.

Furthermore, a plurality of gap formation ribs 331 are formed to protrude from sidewalls of the element groove 330 so that the haptic element 340 may be supported on the plurality of gap formation ribs 331.

That is, because the plurality of gap formation ribs 331 are formed along an internal wall surface of the element groove 330, a position of the haptic element 340 is restricted by the gap formation ribs 331.

Furthermore, a vibrating surface 340*a* on which a vibration is generated is formed on a side surface of the haptic element 340, and the vibration generated from the vibrating surface 340*a* is transmitted to the housing 300 through the gap formation ribs 331 instead of the entire internal surface of the element groove 330.

Therefore, a contact area between the haptic element 340 and the housing 300 is reduced, and thus an unnecessary vibration impact and a noise due to an excessive bumping between parts are reduced to optimize a vibration transmission structure so that a luxurious feeling of the transmitted vibration is implemented to improve marketability.

Furthermore, the housing 300 may be assembled on one surface of inside of the body 100, an end portion of the element groove 330 facing the bottom surface of the element groove 330 may be formed to be open and the haptic element 340 may be inserted through the open portion, and an element fixing rib 106 may be formed to protrude from the other surface of the inside of the body 100 toward the end portion of the element groove 330 to support the haptic element 340.

For example, the housing 300 is screw-engaged with and assembled to the internal surface of the upper body 100*a*.

Furthermore, the end portion of the element groove 330 is formed to be open toward the internal surface of the upper body 100*a*, and the element fixing rib 106 formed on the internal surface of the upper body 100*a* presses the haptic element 340 inserted into the element groove 330 toward the bottom surface of the element groove 330 to fix the position of the haptic element 340.

Thus, the haptic element 340 is prevented from being separated to the outside of the element groove 330 so that the haptic element 340 is stably mounted.

Meanwhile, the above-described operation part assembly 200 includes the groove member 250 and a moving unit together with the gear shifting operation portion, and for understanding of the present disclosure, a coupling relationship between the groove member 250 and the operation part assembly 200 will be described.

Prior to describing the coupling relationship, it is noted that, in expressing directions of components related to the operation part assembly 200 below, a direction opposite to a steering column based on the body 100 is defined and expressed as "one end," and a direction toward the steering column is defined and expressed as "the other end."

Figure 4:
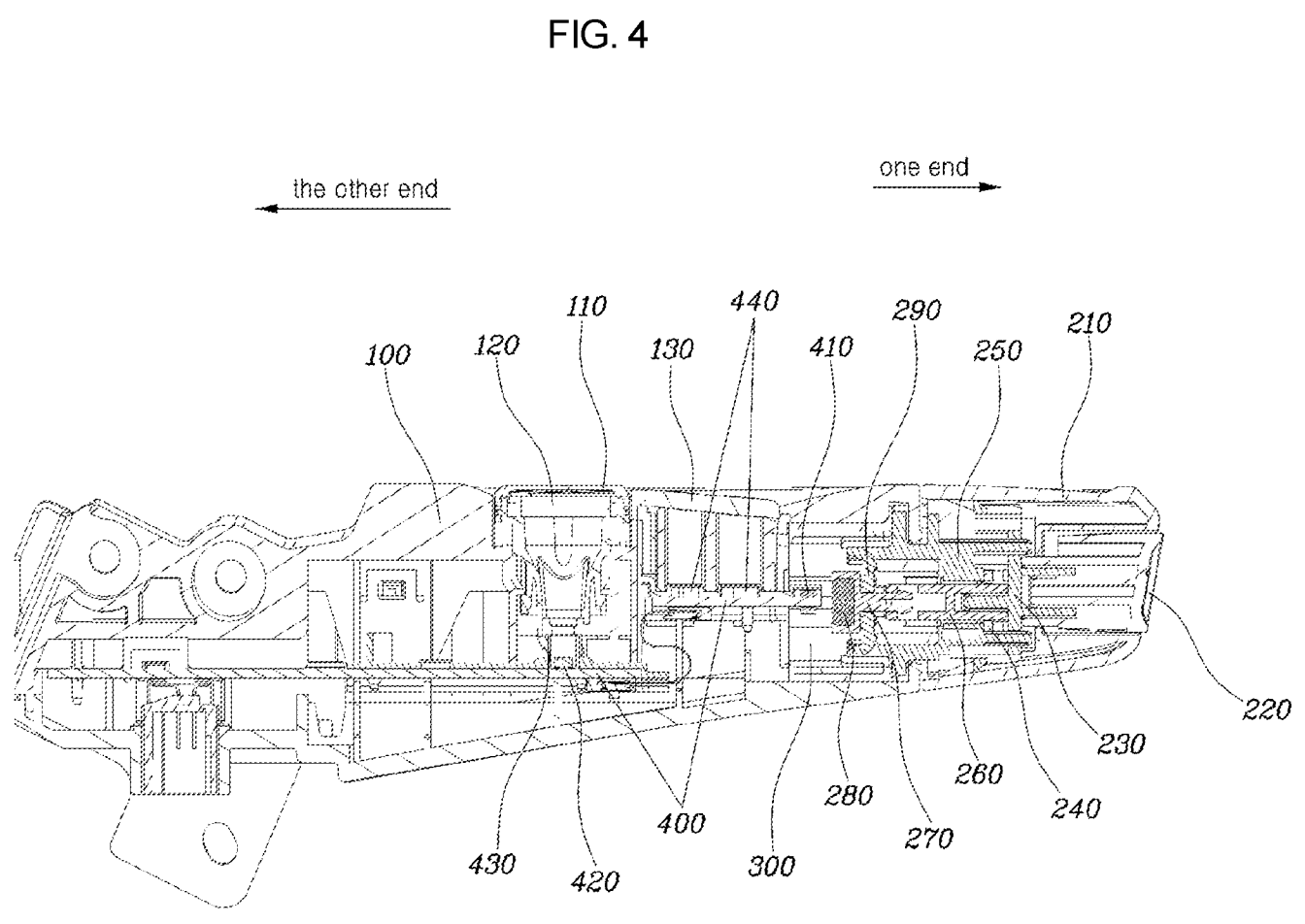
Figure 13:
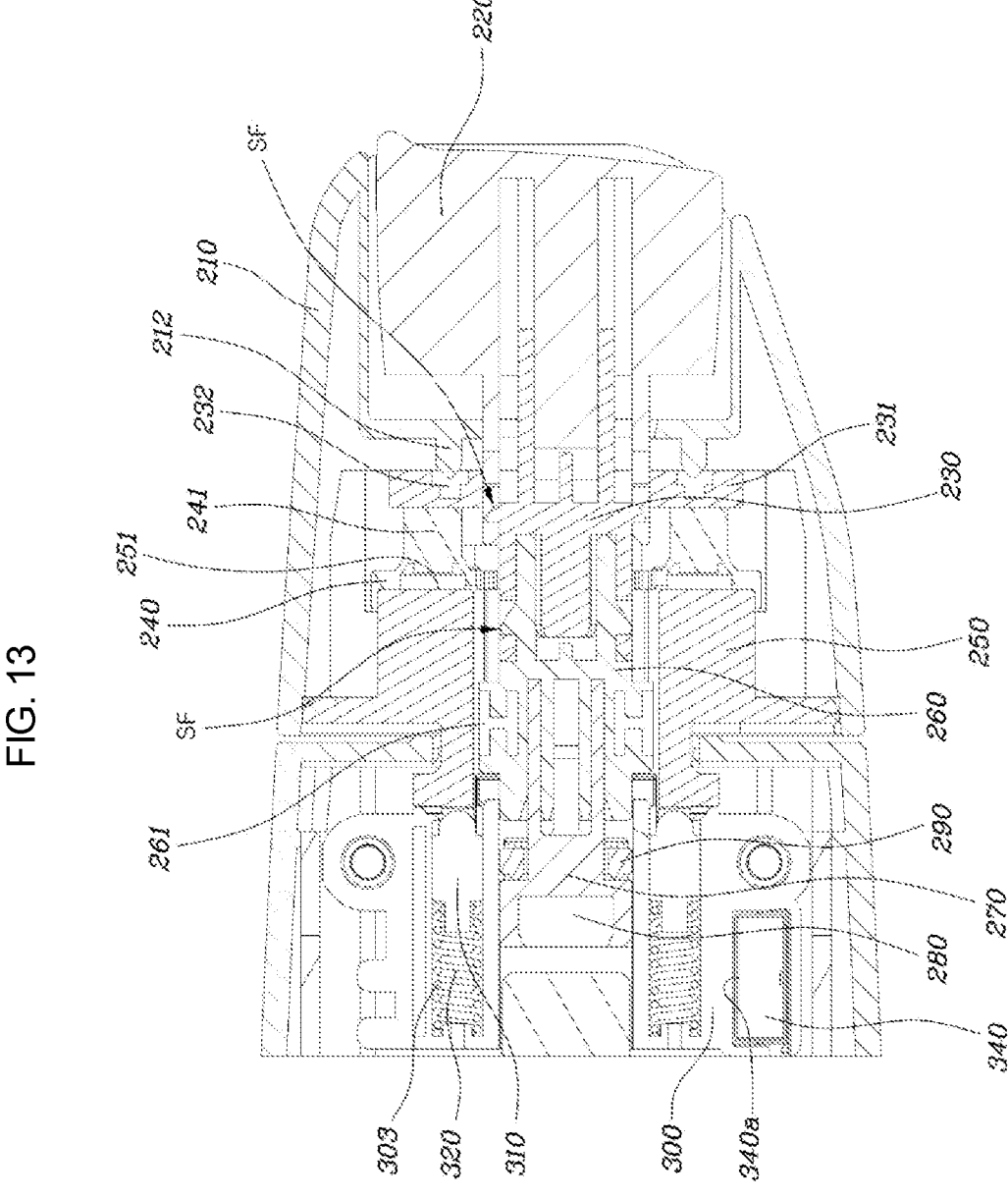
FIG. 13 is a cross-sectional view taken along line C-C of FIG. 12.
Figure 14:
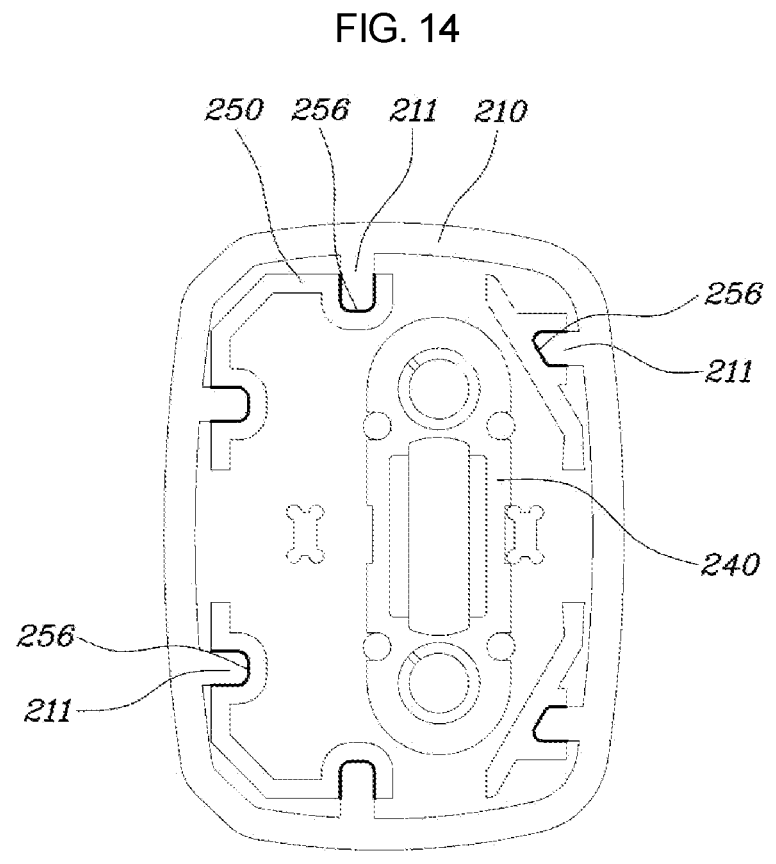

Referring to FIGS. 4, 13, and 14, the other end portion of the body 100 is coupled to the steering column, and the gear shifting knob 210 is provided at one end portion of the body 100 opposite to the steering column.

Furthermore, the groove member 250 is inserted into and coupled to inside of the gear shifting knob 210.

Figure 9:
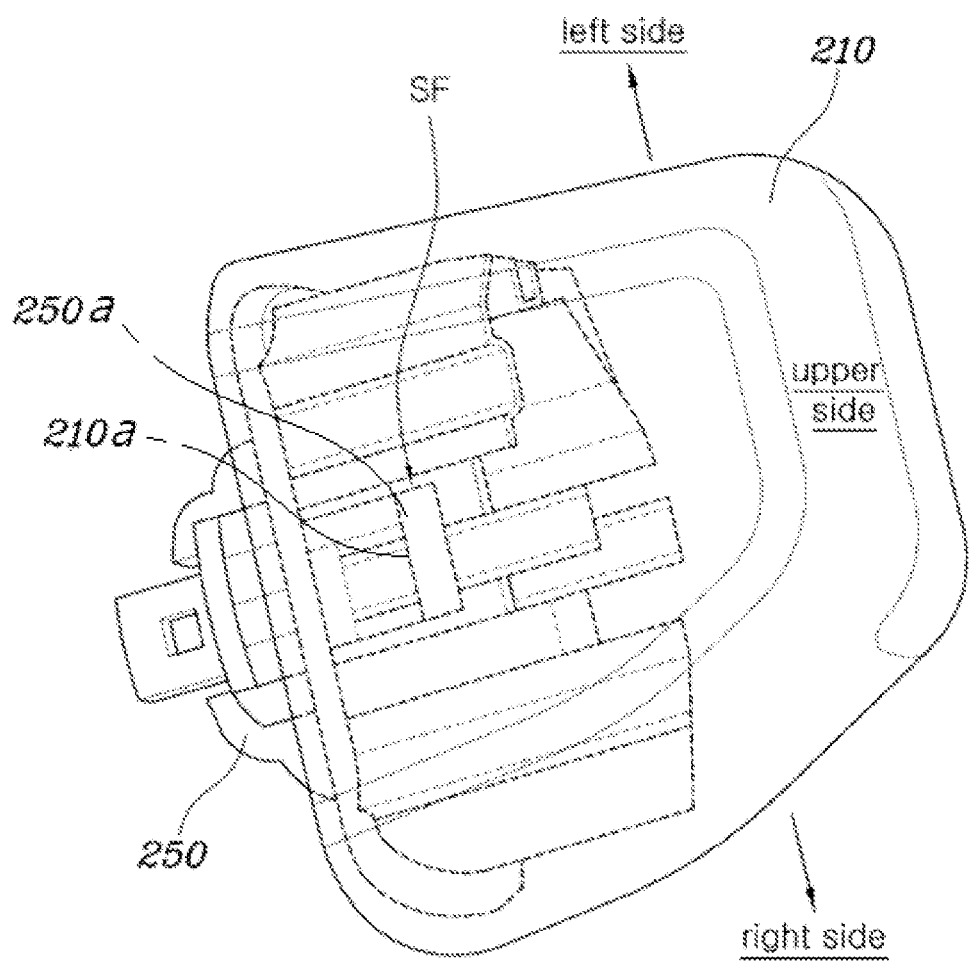
FIG. 9 is a diagram illustrating a state in which a gear shifting knob and a groove member are coupled by a snap-fit engagement structure according to an exemplary embodiment of the present disclosure.

For example, referring to FIG. 9, hooks 250*a* are formed on upper and lower external surfaces of the groove member 250, hook grooves 210*a* including shapes corresponding to the hooks are formed on upper and lower internal surfaces of the gear shifting knob 210, and the groove member 250 is engaged with the gear shifting knob 210 by a snap-fit engagement structure SF between the hook 250*a* and the hook groove 210*a*.

Furthermore, a plurality of position fixing ribs 211 are formed to protrude from the internal surface of the gear shifting knob 210 in the axial direction of the body 100, position fixing grooves 256 including shapes corresponding to the position fixing ribs 211 are formed on the external surface of the groove member 250, and the position fixing ribs 211 are inserted into the position fixing grooves 256. Therefore, the gear shifting knob 210 and the groove member 250 are rigidly fixed and supported without a height difference, and through the rigid fixation, it includes a robust structure against even the vibration of the haptic element 340 and the vibration is effectively transmitted to the gear shifting knob 210.

Furthermore, an axis is formed in the longitudinal direction of the body 100, and one end portion of the groove member 250 is rotatably provided at one end portion of the body 100 around the axis so that, when the gear shifting knob 210 is rotated, the groove member 250 is rotates together with the gear shifting knob 210.

One end portion of the gear shifting button 220 is provided at the center portion of the gear shifting knob 210 in a form of being externally exposed of the gear shifting knob 210.

Furthermore, one end portion of the moving unit is coupled to the gear shifting button 220, and the moving unit passes through the groove member 250 to be embedded in the axial direction of the body 100.

In the instant case, the moving unit is moved relative to the groove member 250 and is pressed toward the inside of the body 100 in the axial direction together with the gear shifting button 220. However, the moving unit is restricted and rotated with the groove member 250, and when the groove member 250 is rotated, the moving unit and the magnet 280 are also rotated.

The magnet 280 is fixed to the other end portion of the moving unit, and the magnet 280 is provided with a predetermined gap g from the sensor 410.

Here, the gap g is a distance between a Hall element for detecting a magnetic force inside the sensor 410 and a surface of the magnet 280.

Figure 20:
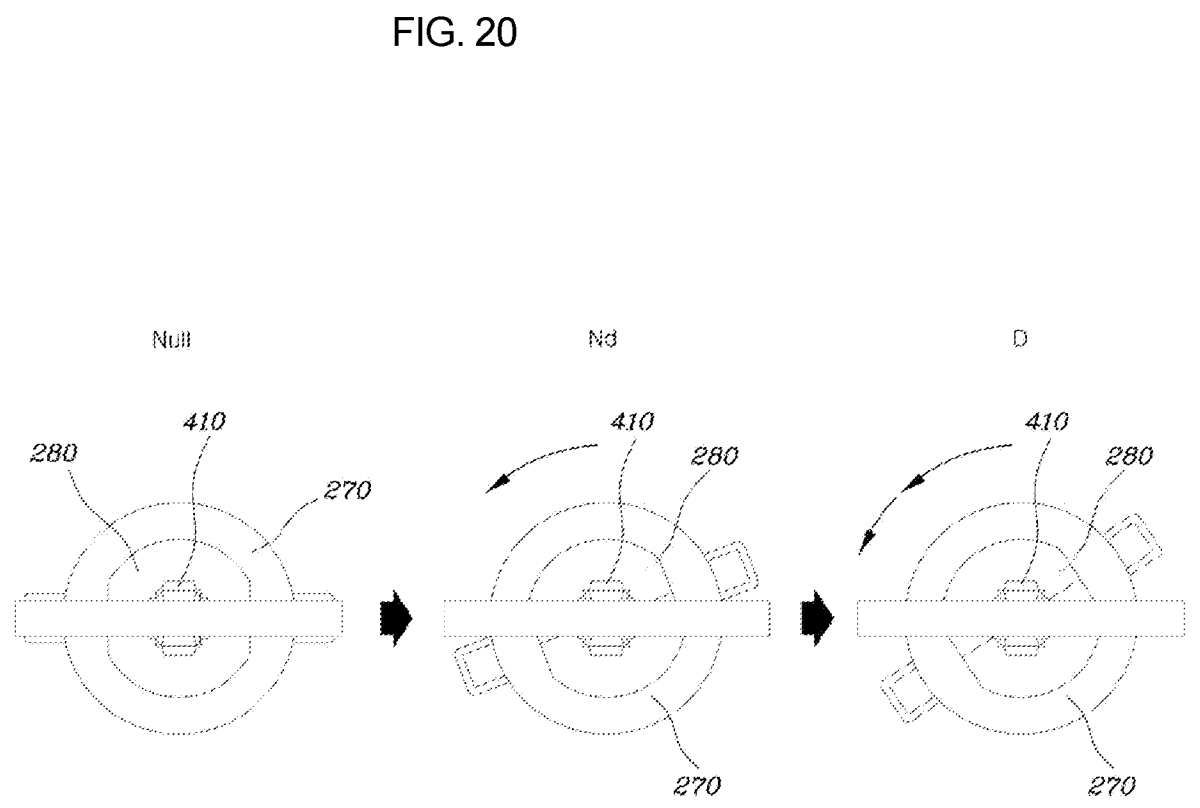
Figure 21:
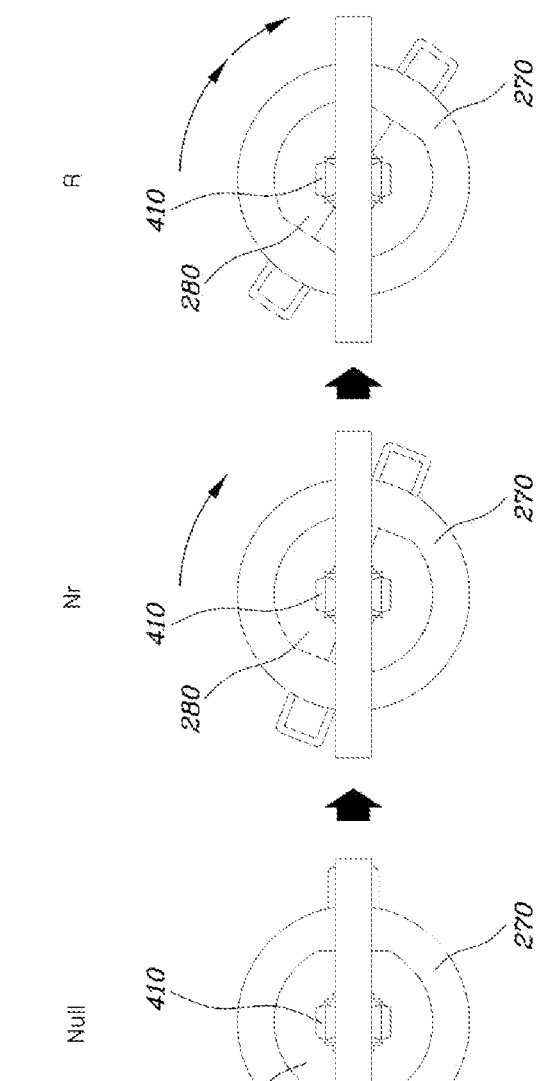
FIG. 21 is a diagram for describing an operation of shifting a gear to an N stage Nr and an R stage according to a rotation in another direction and a rotation angle of the magnet according to an exemplary embodiment of the present disclosure.

That is, as shown in FIGS. 20 and 21, when the gear shifting knob 210 is rotated, the magnet 280 is rotated, and a direction of a magnetic force changes according to the rotation of the magnet 280. Thus, when a changing magnetic force value is detected and the detected magnetic force value is detected as a predetermined magnetic force value, a gear shifting stage signal (R stage, N stage, or D stage) corresponding to the corresponding magnetic force value is recognized, and thus a gear shifting operation may be performed.

Figure 6:
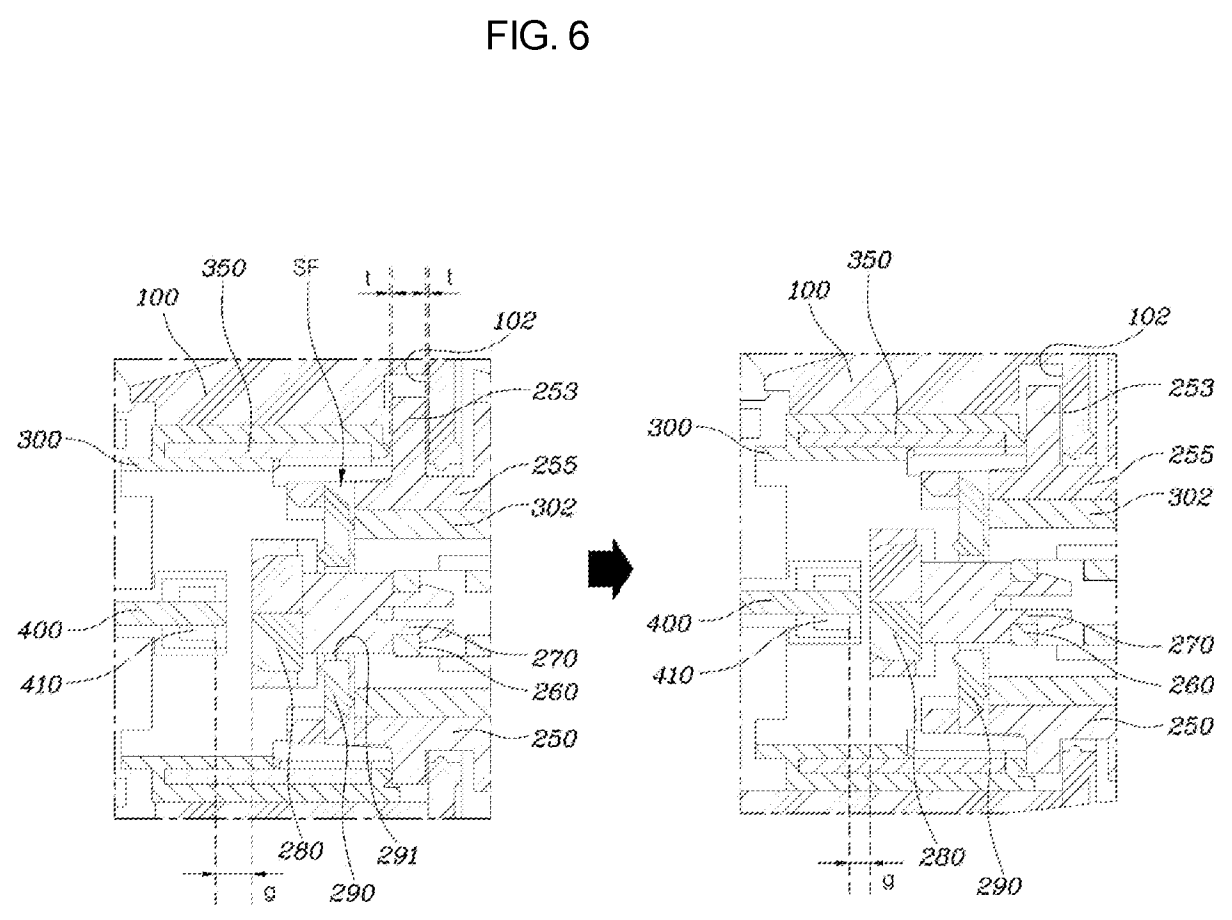

Furthermore, as shown in FIG. 6, when the gear shifting button 220 is pressed, the magnet 280 is moved toward the sensor 410, and a strength of the magnetic force changes according to the movement of the magnet 280. Thus, when a changing magnetic force value is detected and the detected magnetic force value is detected as a predetermined magnetic force value, a gear shifting stage signal (P stage) corresponding to the corresponding magnetic force value is recognized, and thus a gear shifting operation may be performed.

Furthermore, the moving unit includes a button guide 230, a guide shaft 260, the magnet 280, and a magnet shaft 270.

Referring to FIG. 9, FIG. 10 and FIGS. 11 and 13, the other end portion of the gear shifting button 220 is inserted into one end portion of the button guide 230.

In the instant case, hooks are formed on left and right external surfaces in the middle portion of the button guide 230, hook grooves including shapes corresponding to the hooks are formed on left and right of the other end portion of the gear shifting button 220, and thus the gear shifting button 220 and the button guide 230 are engaged by a snap-fit engagement structure SF between the hook and the hook groove.

Furthermore, hooks are formed on left and right external surfaces of the guide shaft 260, hook grooves including shapes corresponding to the hooks are formed on left and right external surfaces of the other end portion of the button guide 230, and thus the guide shaft 260 and the button guide 230 are engaged by a snap-fit engagement structure SF between the hook and the hook groove.

Furthermore, hooks are formed on upper and lower external surfaces of the magnet shaft 270, hook grooves including shapes corresponding to the hooks are formed on upper and lower external surfaces of the other end portion of the guide shaft 260, and thus the magnet shaft 270 and the guide shaft 260 are engaged by a snap-fit engagement structure SF between the hook and the hook groove.

The magnet 280 may be fixed to the center portion of the other end portion of the magnet shaft 270 through insert injection, and the external surface of the magnet 280 may be provided in a state of being exposed toward the sensor 410.

That is, the gear shifting button 220 and the button guide 230, the button guide 230 and the guide shaft 260, and the guide shaft 260 and the magnet shaft 270 are respectively engaged by the snap-fit engagement structure SF so that the moving unit is assembled.

Furthermore, the magnet shaft 270 passes through a bearing hole 291 formed in the center portion of a bush bearing 290, and the bush bearing 290 is restrictedly coupled to the groove member 250.

Figure 10:
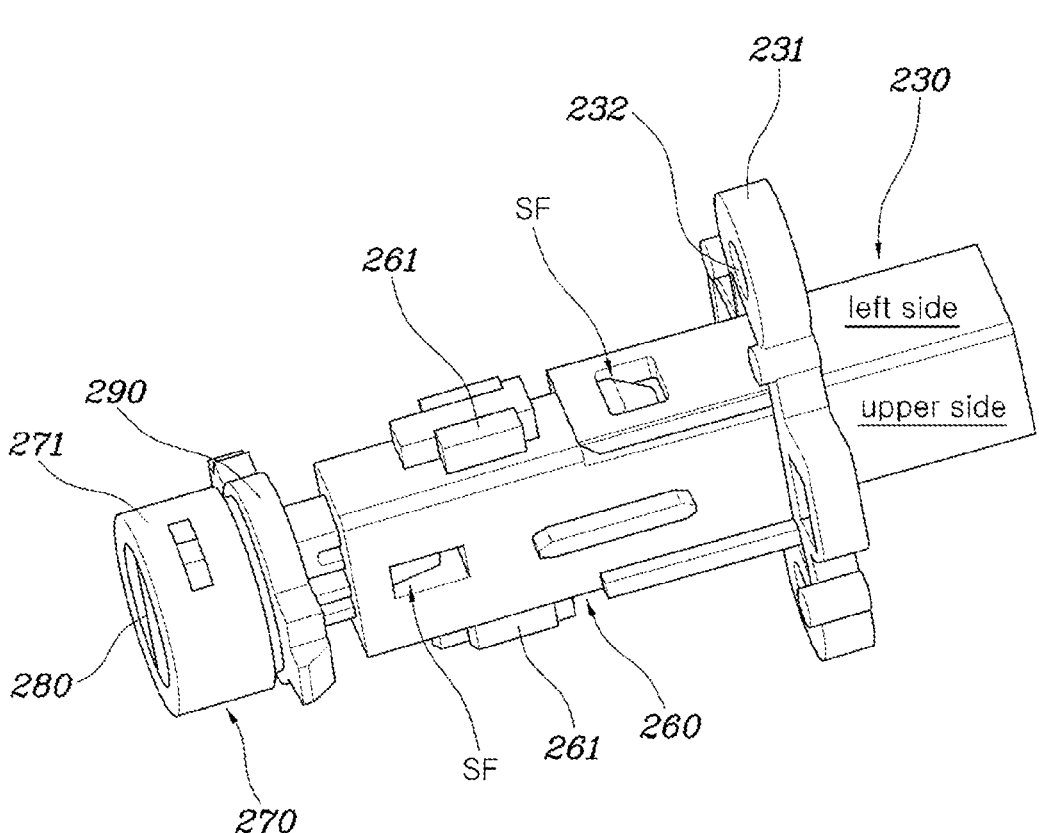
FIG. 10 is a diagram describing a shape of a moving unit and a coupling relationship between the moving unit and a bush bearing according to an exemplary embodiment of the present disclosure.
Figure 11:
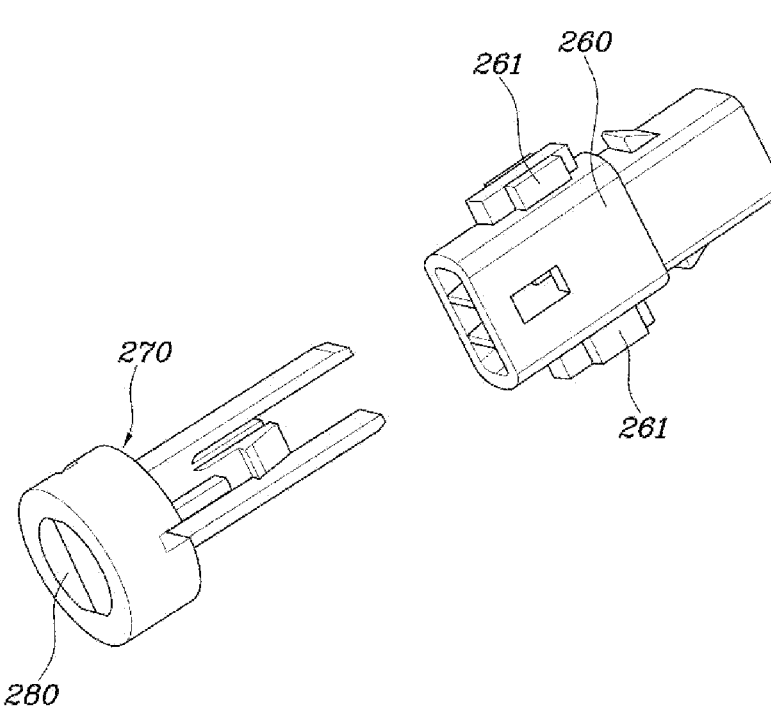
FIG. 11 is an enlarged view exemplarily illustrating a state in which a guide shaft and a magnet shaft are separated according to an exemplary embodiment of the present disclosure.
Figure 19:
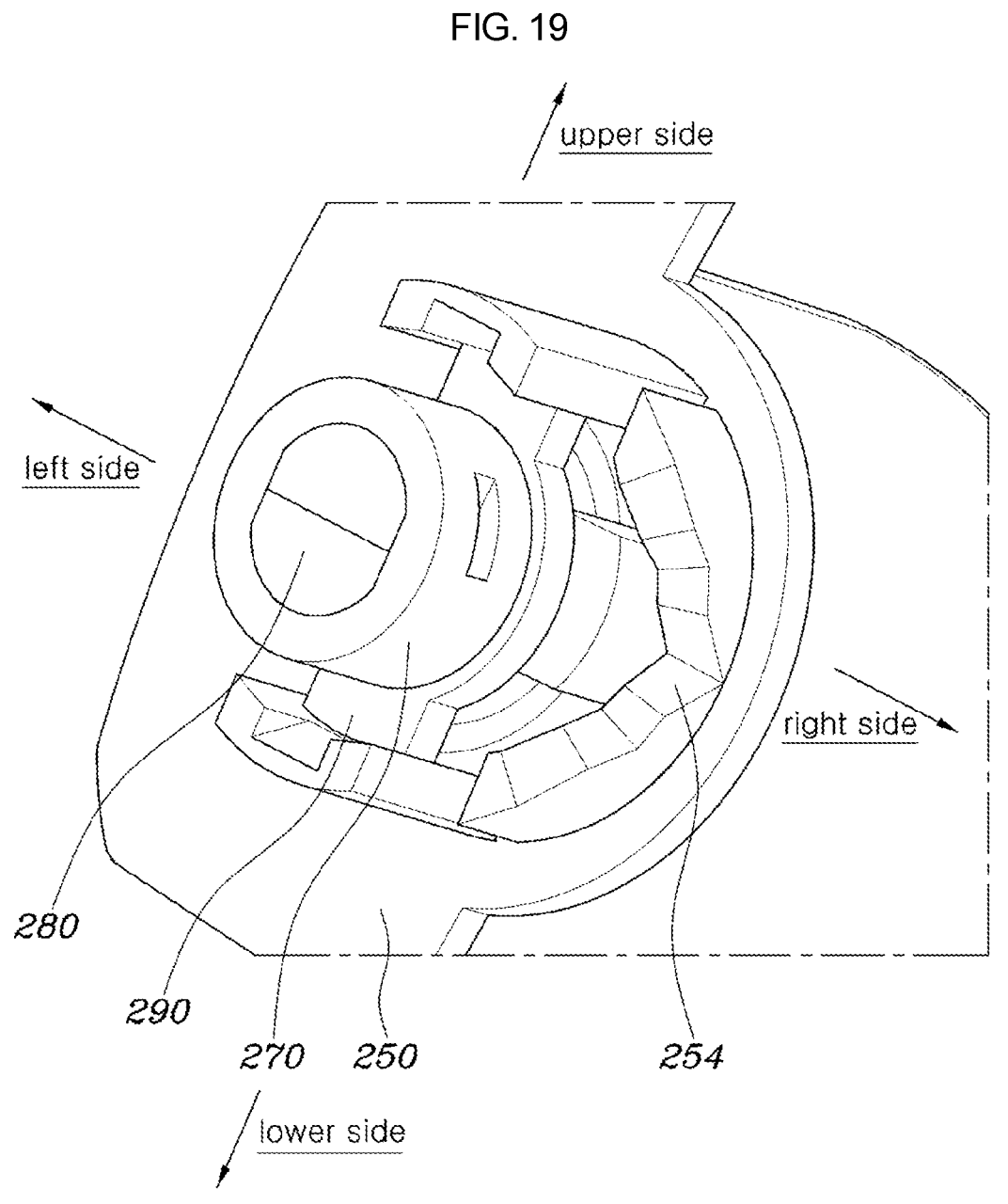

To describe in detail with reference to FIGS. 10 and 19, the bush bearing 290 is formed in an annular shape, hooks are formed on upper and lower external surfaces of the bush bearing 290, hook grooves including shapes corresponding to the hooks are formed on upper and lower external surfaces of the other end portion of the groove member 250, and thus the groove member 250 and the bush bearing 290 are engaged by a snap-fit engagement structure SF between the hook and the hook groove.

Thus, because the magnet shaft 270 is guided by the bush bearing 290 to be moved linearly, the linear movement of the moving unit is stably performed.

Furthermore, a catch portion 271 is formed at one end portion of the magnet shaft 270 to which the magnet 280 is fixed, and a cross-sectional area of the catch portion 271 is formed to be greater than that a cross-sectional area of the bearing hole 291.

Therefore, because the magnet shaft 270 is caught to the bush bearing 290, an excessive movement of the moving unit including the magnet shaft 270 is limited so that the moving unit is prevented from being separated in the axial direction thereof.

Meanwhile, the present disclosure includes a moving restoring member 240 provided between the button guide 230 and the groove member 250 and configured to provide an elastic restoring force for a pressing movement of the gear shifting button 220.

To describe in detail with reference to FIGS. 13 and 14, a surface facing the body 100 among both surfaces of the moving restoring member 240 is supported on the groove support 251 and assembled to the groove member 250.

Furthermore, a rubber portion 241 is formed to protrude from a surface facing the gear shifting button 220 among both the surfaces of the moving restoring member 240 in a form of a nipple.

Furthermore, a guide support 231 is formed in the middle portion of the button guide 230 in an outwardly extending shape, and the rubber portion 241 is supported on the guide support 231. The rubber portion 241 may be formed of an elastic material.

That is, when the gear shifting button 220 is pressed, the rubber portion 241 of the moving restoring member 240 is compressed and thus an elastic restoring force is generated. Thus, when the pressing operation of the gear shifting button 220 is released, a force is applied to push the guide support 231 in a direction of the gear shifting button 220 due to the elastic restoring force of the rubber portion 241, and thus the gear shifting button 220 together with a gear shifting guide is restored and moved to a position before the pressing operation.

Furthermore, a return damper 232 made of an elastic material is embedded in the guide support 231, and thus one surface of the return damper 232 is exposed toward the knob stopper 212.

Furthermore, the knob stopper 212 is formed to include a cross-sectional area which is smaller than a cross-sectional area of the return damper 232 and is supported on the return damper 232.

Therefore, when the gear shifting button 220 is restored and moved after the pressing operation of the gear shifting button 220, the return damper 232 is supported on the knob stopper 212, and thus a noise generated in the restoration operation of the gear shifting button 220 is reduced.

Furthermore, because the return damper 232 and the knob stopper 212 are formed to be compact and to include a simplified structure, the noise may be reduced without increasing a size of the product.

Figure 15:
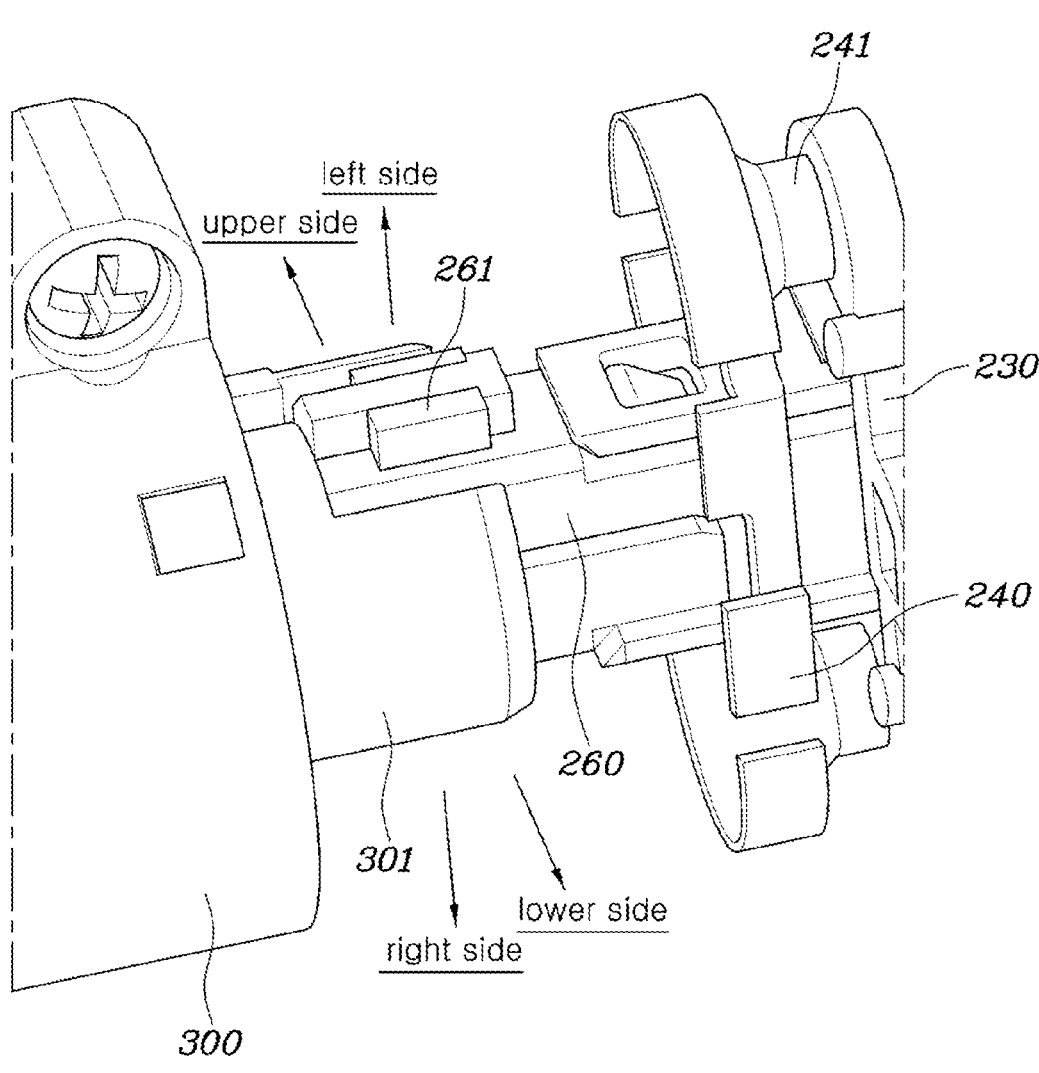
FIG. 15 is a diagram illustrating a housing stopper and a rotating damper according to an exemplary embodiment of the present disclosure.
Figure 16:
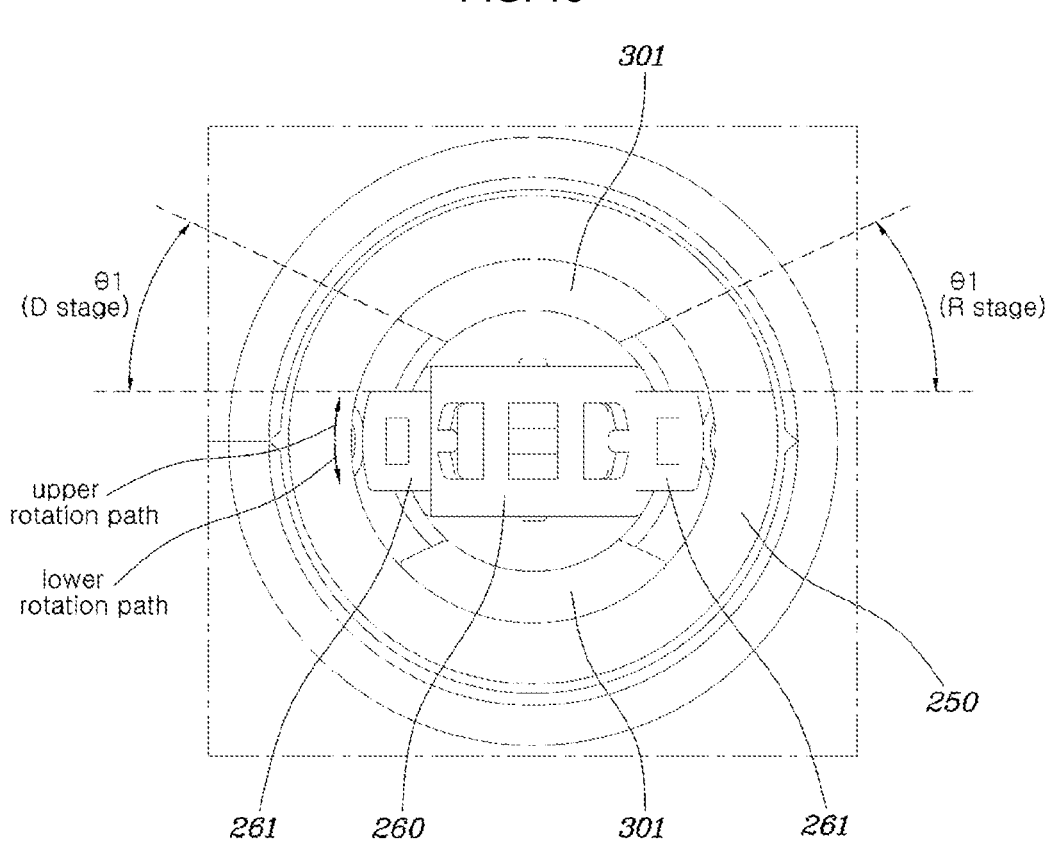
FIG. 16 is a diagram for describing an operation in which a rotating damper is supported on the housing stopper according to an exemplary embodiment of the present disclosure.

Meanwhile, as shown in FIG. 15 and FIG. 16, according to an exemplary embodiment of the present disclosure, rotating dampers 261 each made of an elastic material are provided at left and right sides of an external surface of the guide shaft 260. Here, the rotating dampers 261 may be fixed to the guide shaft 260 through a double injection method.

Furthermore, housing stoppers 301 are formed at a distal portion of one end portion of the housing 300.

The housing stoppers 301 are each formed in an arc shape on upper and lower rotation paths of the rotating damper 261. The housing stopper 301, which is formed on a rotation path in one direction of the rotating damper 261, is formed at a predetermined angle with respect to the rotating damper 261 to serve as a stopper for a gear shifting manipulation direction to the D stage, and the housing stopper 301, which is formed on a rotation path in another direction of the rotating damper 261, is formed at a predetermined angle with respect to the rotating damper 261 to serve as a stopper for a gear shifting manipulation direction to the R stage.

Thus, when the gear shifting knob 210 is rotated in one direction for the gear shifting to the D stage, the rotating damper 261 is rotated in one direction by as much as a predetermined angle together with the guide shaft 260 and is supported on the housing stopper 301, and thus an operating noise generated by the rotation operation of the gear shifting knob 210 is suppressed.

Furthermore, when the gear shifting knob 210 is rotated in another direction for the gear shifting to the R stage, the rotating damper 261 is rotated in another direction by as much as a predetermined angle together with the guide shaft 260 and is supported on the housing stopper 301, and thus an operating noise generated by the rotation operation of the gear shifting knob 210 is suppressed.

Figure 17:
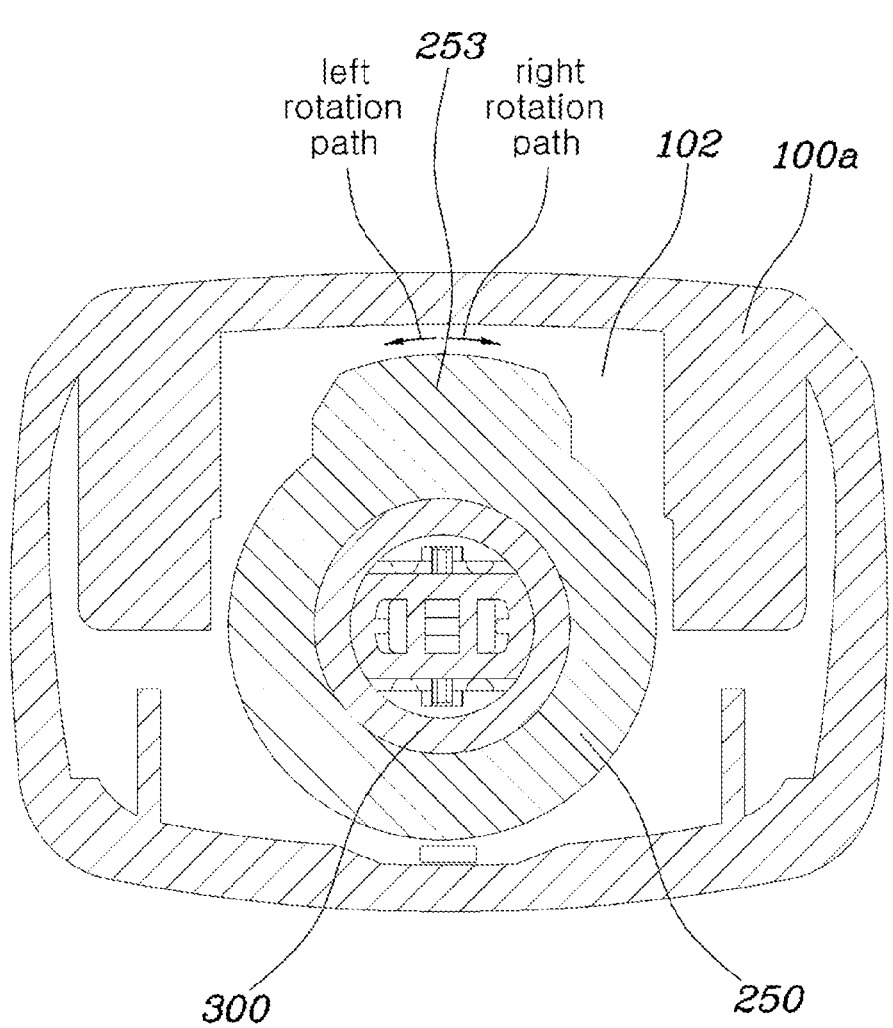
FIG. 17 is a diagram for describing an operation in which a groove stopper is supported on a body stopper according to an exemplary embodiment of the present disclosure.

Furthermore, as shown in FIG. 17, a groove stopper 253 is formed to protrude from an external circumferential surface in the middle portion of the groove member 250, and body stoppers 103 are respectively formed on paths where the groove stopper 253 is rotated in left and right directions on the internal surface of the body 100.

In the instant case, the body stopper 103 formed on a rotation path in one direction of the groove stopper 253 is formed at a predetermined angle with respect to the groove stopper 253 to serve as a stopper for a gear shifting manipulation direction to the D stage, and the body stopper 103 formed on a rotation path in another direction of the groove stopper 253 is formed at a predetermined angle with respect to the groove stopper 253 to serve as a stopper for a gear shifting manipulation direction to the R stage.

Thus, when the gear shifting knob 210 is rotated in one direction for the gear shifting to the D stage, the groove stopper 253 is rotated in one direction by as much as a predetermined angle together with the groove member 250 and is supported on the body stopper 103.

Furthermore, when the gear shifting knob 210 is rotated in another direction for the gear shifting to the R stage, the groove stopper 253 is rotated in another direction by as much as a predetermined angle together with the groove member 250 and is supported on the body stopper 103.

Here, a maximum rotation angle θ2 of the groove stopper 253 may be formed to be greater than a maximum rotation angle θ1 of the rotating damper 261.

Thus, when the gear shifting knob 210 is rotated, the rotating damper 261 made of an elastic material collides first with the housing stopper 301 than the groove stopper 253 to limit the rotation angle of the gear shifting knob 210.

However, when the gear shifting knob 210 is rotated with a larger rotation force in a state in which the rotating damper 261 collides with the housing stopper 301, the groove stopper 253 collides with the body stopper 103 and is supported thereon.

To describe in more detail, the rotating dampers 261 are disposed at the left and right sides of the external surface of the guide shaft 260 and come into contact with and are supported on the housing stoppers 301 formed on the upper and lower rotation paths when the gear shifting knob 210 is rotated, and the groove stopper 253 protrudes upwards from an external circumferential surface of the groove member 250 and come in contact with and are supported on the body stoppers 103 formed on left and right rotation paths when the gear shifting knob 210 is rotated.

Here, the rotating damper 261 made of an elastic material comes into contact with first and is supported on the housing stopper 301, and when the gear shifting knob 210 is rotated with a larger rotation force in a state in which the rotating damper 261 comes in contact with the housing stopper 301, the groove stopper 253 additionally comes into contact with and is supported on the body stopper 103.

That is, because the rotating damper 261 and the groove stopper 253 are disposed to be orthogonal to each other, when the gear shifting knob 210 is rotated, the rotating damper 261 and the groove stopper 253 come into contact with and are supported on the stoppers, respectively, in the vertical and horizontal directions, and a double structure is configured so that the rotating damper 261 and the groove stopper 253 sequentially come into contact with and are supported on the stoppers. Thus, the double structure may be a structure of reducing a noise according to the manipulation and robustly supporting the gear shifting knob even when the gear shifting knob is manipulated by an excessive force.

Furthermore, as shown in FIG. 6, a damper groove 102 is formed on the internal surface of the body 100, the groove stopper 253 is formed to radially protrude from the external circumferential surface in the middle portion of the groove member 250, and the groove stopper 253 is inserted with a small gap t with respect to an internal surface of the damper groove 102.

That is, the damper groove 102 is formed on the internal surface of the body 100 positioned in an external radial direction of the groove stopper 253 and the groove stopper 253 is inserted, and one surface and the other surface of the groove stopper 253 are inserted with the small gap t with respect to the internal surface of the damper groove 102 so that the groove stopper 253 may be rotated without being caught by the body 100.

When an external force is applied to pull the gear shifting knob 210 toward one end portion of the body 100 or to push the gear shifting knob 210 toward the other end portion of the body 100, the gap t between one surface or the other surface of the groove stopper 253 and the damper groove 102 is decreased, and thus the groove stopper 253 is supported on one of internal surfaces of both sides of the damper groove 102.

Therefore, even when a large external force or an impact is applied to the gear shifting knob 210 due to a mistake of a driver or during getting on or off a vehicle, the gear shifting knob 210 is robustly supported so that the gear shifting knob 210 is prevented from being damaged or separated.

Meanwhile, as shown in FIG. 6 and FIG. 7, the present disclosure further includes a shielding member 350 provided in an annular shape that axially surrounds the sensor 410 and the magnet 280 in the body 100 and configured to shield an external magnetic field.

That is, to reduce a magnetic force detection error of the sensor 410 due to a magnetic force input from the outside thereof, it is appropriate to form a detecting area of the sensor 410 at a position far from the outside thereof. However, the transmission system provided in the steering column includes a limitation in keeping a far distance between the detecting area and external parts due to a characteristic of a miniaturized product.

Therefore, in an exemplary embodiment of the present disclosure, by configuring the magnet 280 to face the sensor 410 to minimize the detecting area of the sensor 410, a structure for shielding the external magnetic force is implemented even by installing the shielding member 350 to surround the sensor 410 and the magnet 280.

Therefore, the magnetic force shielding structure is miniaturized and configured to be optimized for the transmission system for the steering column.

Here, the shielding member 350 is a magnetic body formed in an annular shape and may be manufactured by bending or lathe turning after pressing.

However, the shielding member 350 is not limited to a specific material and a specific shape, and the shape of the shielding member 350 may be determined according to shapes of the surrounding parts and may be freely formed in a structure for surrounding the magnet 280 and the sensor 410.

Furthermore, the shielding member 350 may be embedded in the housing 300 coupled to the inside of the body 100.

For example, the other end portion of the housing 300 is formed in a shape of cylinder and coupled to the internal surface of the body 100 by a screw.

Furthermore, the shielding member 350 is insert-injected into the other end portion of the housing 300 in an annular shape to serve to shield a magnetic field.

That is, when the gear shifting operation portion is operated in the axial direction thereof and the magnet 280 is moved linearly, the shielding member 350 does not interfere with the linear movement path of the magnet 280 and the annular shielding member 350 shields an external magnetic field so that a rotational displacement and a movement displacement of the magnet 280 are accurately detected.

Meanwhile, the present disclosure may include a restoration portion provided in a state of constantly being in constant contact with the housing 300 and the groove member 250 and configured to provide an elastic restoring force for the rotational operation of the groove member 250 according to a rotational gear shifting operation of the gear shifting operation portion.

To describe a configuration of the restoration portion, the restoration portion includes a gear shifting groove 254 formed at an end portion of the groove member 250 in a groove shape along a path in which the groove member 250 is rotated, a bullet groove 303 formed in the housing 300, a bullet 310 movably inserted into the bullet groove 303 and supported on the gear shifting groove 254, and a return spring 320 configured to provide an elastic restoring force to the bullet 310 in a direction toward the gear shifting groove 254.

Furthermore, the bullet groove 303 is formed in the axial direction of the body 100 and thus an opening of the bullet groove 303 is formed to face the gear shifting groove 254, and the return spring 320 may be supported between an internal end portion of the bullet groove 303 and the bullet 310.

Figure 18:
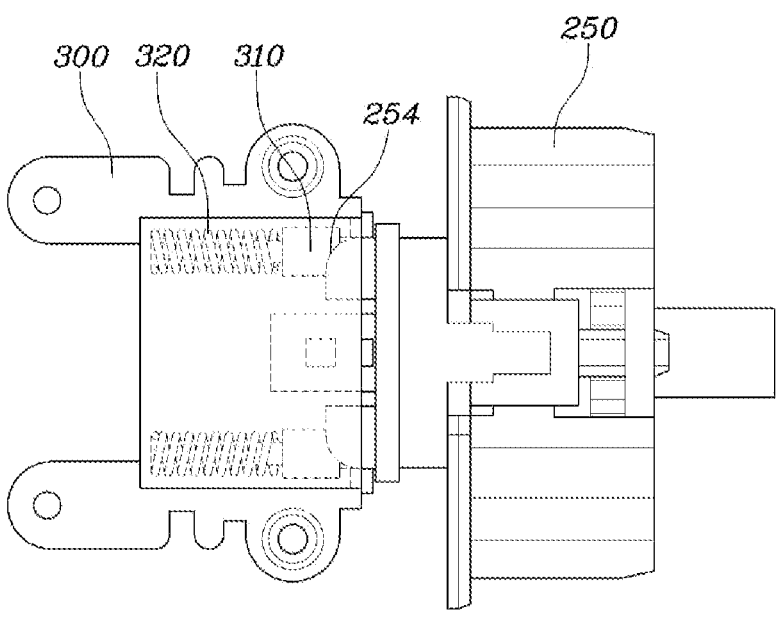
FIG. 18 is a diagram for describing a structure in which a bullet is supported on a gear shifting groove by a return spring according to an exemplary embodiment of the present disclosure.

As shown in FIGS. 13 and 18, the bullet groove 303 is formed inside each of both sides of the housing 300, and the bullet 310 is inserted into the bullet groove 303. Furthermore, the return spring 320 is formed in a coil spring shape, one end portion of the return spring 320 is supported on one end portion of the bullet 310, and the other end portion of the return spring 320 is supported on an internal end portion of the bullet groove 303.

That is, the return spring 320 is in contact with the housing 300, and the bullet 310 in contact with the return spring 320 maintains a state of constantly being in contact with the groove member 250. Thus, a vibration generated by the haptic element 340 may be transmitted to the housing 300, and the vibration transmitted to the housing 300 may be transmitted to the driver through the groove member 250 and the gear shifting knob 210.

Furthermore, the gear shifting groove 254 including an inclined groove profile in a "V" shape is formed in the groove member 250 facing the bullet groove 303, and the other end portion of the bullet 310 is supported on the gear shifting groove 254.

That is, when the gear shifting knob 210 is rotated in one direction or another direction, the groove member 250 is rotated, and thus the bullet 310 supported on the gear shifting groove 254 is guided along the inclined groove profile of the gear shifting groove 254. Thus, the bullet 310 compresses the return spring 320 and is linearly moved along the bullet groove 303.

Furthermore, when the driver releases a rotational operation force of the gear shifting knob 210 in a state in which the return spring 320 is compressed by a gear shifting operation of the gear shifting knob 210 to the D or R stage, the bullet 310 is to be restored and moved again toward a central valley portion of the gear shifting groove 254 due to the elastic restoring force of the return spring 320 along the inclined surface of the gear shifting groove 254. Thus, the groove member 250 is restored to the state before the rotation, and thus the bullet 310 is positioned at the central valley portion of the gear shifting groove 254.

Thus, when the gear shifting operation is completed, the gear shifting knob 210 is restored to an initial position and moved to a null position.

For reference, as shown in FIG. 19, the gear shifting groove 254 is formed to be inclined from the center portion toward both end portions, and at least one step difference may be formed on the inclined surface.

Thus, as shown in FIGS. 20 and 21, when the gear shifting knob 210 is rotated and when the gear shifting knob 210 reaches a position of a first rotation angle, the bullet 310 is caught on the step difference of the gear shifting groove 254 and moved to an Nd or Nr position according to the rotational manipulation direction thereof. At the present position, when the bullet 310 proceeds over the step difference due to an additional rotational manipulation of the gear shifting knob 210 and thus the gear shifting knob 210 reaches a position of a second rotation angle which is greater than the first rotation angle, the gear is shifted to the D or R stage.

Therefore, a gear shifting operation feeling and a restraint feeling according to the rotational manipulation of the gear shifting knob 210 may be formed.

For reference, before the gear shifting is performed to the D stage or R stage due to the rotation in one direction or another direction of the gear shifting knob 210, the gear shifting is performed to the N stage at the Nd or Nr position.

Figure 2:
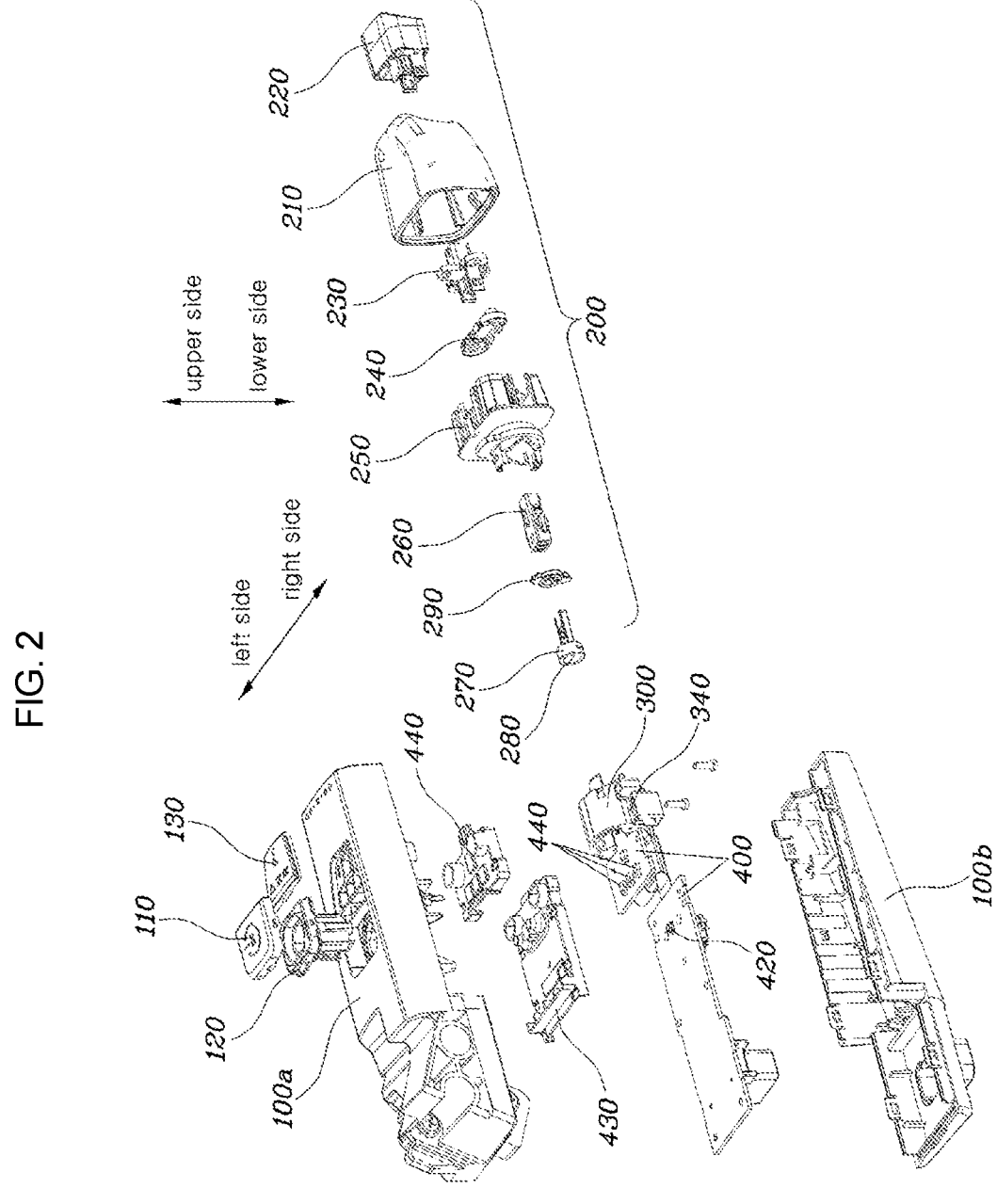
FIG. 2 is an exploded diagram illustrating the shift-by-wire transmission system according to an exemplary embodiment of the present disclosure.
Figure 5:
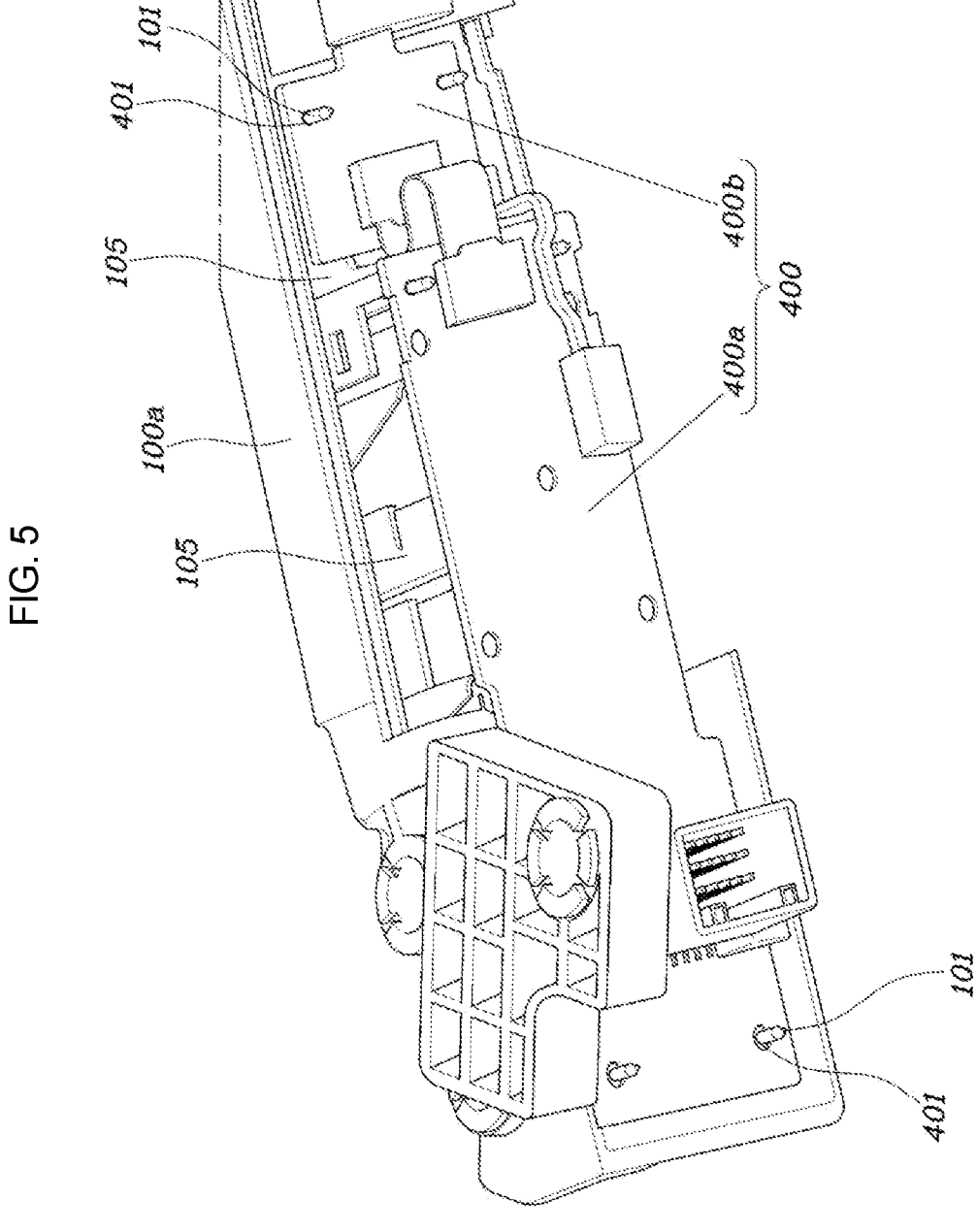
FIG. 5 is a diagram for describing a structure in which a printed circuit board (PCB) is provided in a body according to an exemplary embodiment of the present disclosure.

Meanwhile, as shown in FIGS. 2 and 6, because the end portion of the housing 300 is inserted into the end portion of the groove member 250 with a small gap at a level configured for transmitting a vibration, the vibration generated by the haptic element 340 may be transferred from the housing 300 to the groove member 250.

For example, a cylindrical housing insertion portion 302 is formed at one end portion of the housing 300 toward the groove member 250 and a cylindrical groove insertion portion 255 is formed at the other end portion of the groove member 250 toward the housing 300, and thus an external circumferential surface of the housing insertion portion 302 is inserted into an internal circumferential surface of the groove insertion portion 255.

In the instant case, because a gap between the external circumferential surface of the housing insertion portion 302 and the internal circumferential surface of the groove insertion portion 255 is formed close to zero, the vibration transmitted to the housing 300 is transmitted to the groove member 250.

Furthermore, because the groove member 250 is restrictedly coupled to the gear shifting knob 210 through the snap-fit engagement structure SF, the vibration transmitted to the groove member 250 is transmitted to the gear shifting knob 210.

Thus, when the driver manipulates the gear shifting knob 210 to shift the gear to the R stage, the vibration generated by the haptic element 340 is transmitted to the driver through the gear shifting knob 210 so that the driver may more clearly recognize that the gear shifting operation is performed to the R stage.

Figure 3:
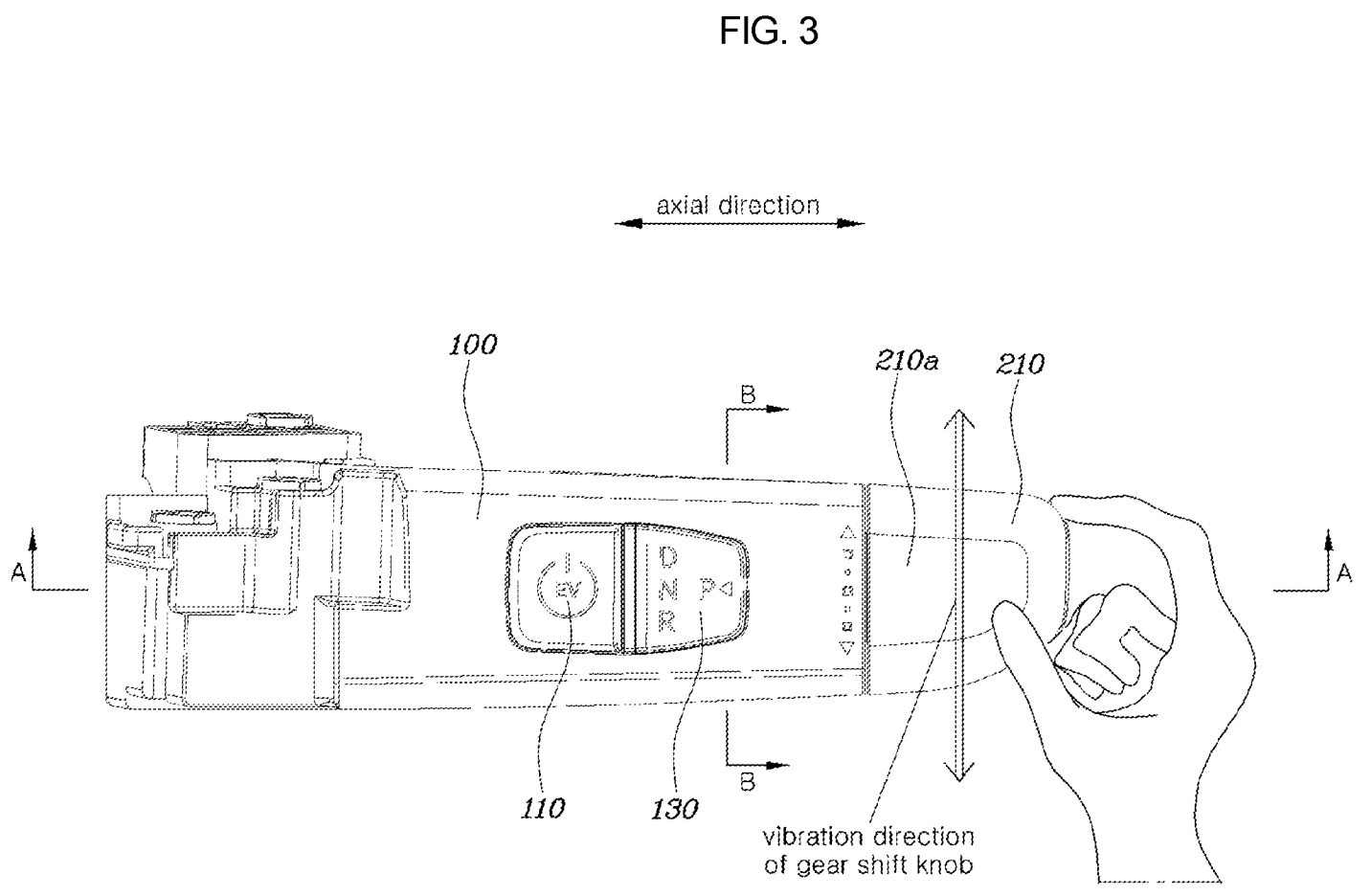

Meanwhile, as shown in FIG. 3, according to present disclosure, grip surfaces 210a gripped during the gear shifting operation may be formed on the surface of the gear shifting operation portion, and the haptic element 340 may be disposed so that the vibration generated by the haptic element 340 is transmitted to the grip surfaces 210a in a horizontal direction thereof.

That is, the grip surfaces 210a are formed in a radial direction one side and a radial direction of the other side of the gear shifting operation portion so that the driver rotates the gear shifting operation portion in a state in which fingers of the driver hold the grip surface 210a.

In the instant case, because a direction of the vibration transmitted to the grip surface 210a is changed according in a direction in which the haptic element 340 is disposed in the housing 300, a direction of the vibration felt by the hand is also changed.

Therefore, the vibration of the haptic element 340 is transmitted in a direction parallel to the grip surface 210*a* by adjusting the arrangement direction of the haptic element 340 so that the vibration of the haptic element 340 is transmitted as a vibration rubbing the fingers to improve a vibration feeling.

To describe the arrangement direction of the haptic element 340 for transmitting the vibration of the haptic element 340 as a vibration rubbing the fingers with reference to FIGS. 3 and 8, the grip surface 210*a* may be formed in a direction parallel to the axial direction of the body 100, the vibrating surface 340*a* formed on the surface of the haptic element 340 may be in contact with the housing 300 to transmit the vibration, and the vibrating surface 340*a* may be disposed in a direction parallel to the axial direction of the body 100 and in a direction orthogonal to the grip surface 210*a*.

That is, the vibrating surface 340*a* formed on the side surface of the haptic element 340 is in contact with the internal wall surface of the element groove 330, and the internal wall surface of the element groove 330 is positioned toward an internal radial direction of the housing 300 so that the vibration generated by the haptic element 340 is transmitted to the internal radial direction of the housing 300.

Furthermore, because the grip surface 210*a* is formed in a flat shape and formed in a direction perpendicular to the vibrating surface 340*a*, the direction of the vibration transmitted from the haptic element 340 to the housing 300 and a direction of plane formation of the grip surface 210*a* become the same.

Accordingly, the vibration of the haptic element 340 may be transmitted as a vibration rubbing the fingers of the driver coming into contact with the grip surface 210*a*. That is, a vibration transmitted in a direction perpendicular to the gripping fingers of the driver as a vibration hitting the gripping fingers may cause discomfort to the driver, and the vibration in a direction for rubbing the fingers of the driver includes an advantage of forming a more luxurious operation feeling.

Meanwhile, as shown in FIGS. 1 and 4, a start button 110 is provided in the upper body 100*a*, and a slider 120 with a hollow is coupled to the start button 110. The slider 120 is provided to be inserted into the upper body 100*a* and to be linearly movable toward the lower body 100*b* according to a pressing operation of the start button 110.

Furthermore, a printed circuit board (PCB) is provided in the body 100 as the controller 400, and a start lamp 420 is mounted on the PCB. The start lamp 420 is provided at a position directly below the slider 120.

Thus, when starting by pressing the start button 110, the start lamp 420 in a turned-on state may be turned off.

Furthermore, a start button rubber 430 made of an elastic material is assembled between the start lamp 420 and the slider 120.

Thus, the start button rubber 430 returns the start button 110 to the position before the operation of the start button 110 and is configured to emit light-emitting diode (LED) light of the start lamp 420 to the start button 110 through the hollow of the slider 120.

Furthermore, the start button rubber 430 is also configured to prevent moisture and foreign materials from entering the PCB and the start lamp 420.

Furthermore, the upper body 100*a* is provided with an indicator 130, and the indicator 130 displays phrases of P stage, R stage, N stage, and D stage to convey engagement information of the gear shifting stage and to guide a gear shifting operation method and an operation direction thereof.

Furthermore, indicator lamps 440 are mounted on the PCB, and the indicator lamps 440 individually display the phrases of P stage, R stage, N stage, and D stage, and each indicator lamp 440 is provided at a position directly below the displayed phrase.

Thus, when the gear shifting stage is shifted according to the gear shifting operation, the indicator lamp 440 corresponding to a phrase display of a corresponding gear shifting stage may be turned on.

Furthermore, an indicator rubber 450 made of an elastic material is assembled between the indicator lamp 440 and the indicator 130.

Thus, the indicator rubber 450 is configured to emit the light-emitting diode (LED) light of the indicator lamp 440 for each gear shifting stage phrase and to prevent moisture and foreign materials from entering the PCB and the indicator lamp 440.

Hereinafter, the gear shifting operation using the shift-by-wire transmission system of the present disclosure will be described.

To describe a gear shifting operation of a P stage with reference to FIG. 6, when the gear shifting button 220 is pressed toward the body 100, the moving unit including the gear shifting button 220 is moved toward the sensor 410, and the magnet 280 coupled to the moving unit is also moved toward the sensor 410.

Thus, the gap g formed between the magnet 280 and the sensor 410 is decreased, and thus a strength of the magnetic force of the magnet 280 detected by the sensor 410 varies.

Therefore, when the varied magnetic force value of the magnet 280 is detected as a magnetic force value corresponding to a P stage signal, a P stage gear shifting signal is generated and transmitted to the vehicle to form the P stage.

In the present way, when the P stage is formed by pressing the gear shifting button 220, the nipple-shaped rubber portion 241 formed on the moving restoring member 240 becomes a compressed state.

In the present state, when the driver releases the force pressing the gear shifting button 220, the button guide 230 is pushed by an elastic restoring force for restoring the compressed rubber portion 241, and the gear shifting button 220 is restored and moved to a position before the manipulation together with the moving unit.

Therefore, the driver shifts the gear while feeling the gear shifting operation of the P stage, and the gear shifting button 220 is automatically returned so that a subsequent gear shifting operation of the gear shifting button 220 may be easily performed.

Next, to describe the gear shifting operation of the R stage and the D stage with reference to FIGS. 20 and 21, when the gear shifting knob 210 is rotated in one direction at a position of the N stage, the operation part assembly 200 is rotated in a rotation direction of a rotation knob together with the gear shifting knob 210, and the magnet 280 included in the operation part assembly 200 is also rotated in the rotation direction of the gear shifting knob 210.

Thus, the magnet 280 is rotated, and thus the direction of the magnetic force of the magnet 280 detected by the sensor 410 is changed.

Therefore, when the varied magnetic force value of the magnet 280 is detected as a magnetic force value corresponding to a D stage signal, a D stage gear shifting signal is generated and transmitted to the vehicle to shift the gear to the D stage.

Likewise, when the gear shifting knob 210 is rotated in another direction at the position of the N stage, the operation part assembly 200 is rotated in a rotation direction of a rotation knob together with the gear shifting knob 210, and the magnet 280 included in the operation part assembly 200 is also rotated in the rotation direction of the gear shifting knob 210.

Thus, the magnet 280 is rotated, and thus the direction of the magnetic force of the magnet 280 detected by the sensor 410 is changed.

Therefore, when the varied magnetic force value of the magnet 280 is detected as a magnetic force value corresponding to an R stage signal, an R stage gear shifting signal is generated and transmitted to the vehicle to shift the gear to the R stage.

In the present way, when the gear shifting knob 210 is rotated in one direction or another direction, the bullet 310 is guided along the gear shifting groove 254 and moved along the bullet groove 303 to compress the return spring 320.

In the present state, when the driver releases the force for rotating the gear shifting knob 210, the bullet 310 is restored and moved toward the valley portion along the gear shifting groove 254 due to the elastic restoring force of the return spring 320, and the gear shifting knob 210 is restored to the initial position and moved to the null position.

Therefore, the driver shifts the gear while feeling the gear shifting operation of the D or R stage, and the gear shifting knob 210 is automatically returned so that a subsequent gear shifting operation of the gear shifting knob 210 may be easily performed.

When the gear shifting knob 210 is rotated to shift the gear to the R stage, the controller 400 transmits an operating signal to the haptic element 340 and thus a vibration is generated in the haptic element 340, and the vibration generated from the haptic element 340 is transmitted to the housing 300 in physical contact with the element groove 330.

Accordingly, the vibration transmitted to the housing 300 is transmitted to the cylindrical housing insertion portion 302, and the vibration transmitted to the housing insertion portion 302 is transmitted to the groove insertion portion 255 inserted into the housing insertion portion 302.

That is, because a gap between the housing insertion portion 302 and the groove insertion portion 255 is formed close to zero, the housing insertion portion 302 and the groove insertion portion 255 becomes a state in which the vibration may be transmitted and received, and thus the vibration transmitted to the housing 300 is transmitted to the groove member 250.

Furthermore, the return spring 320 embedded in the bullet groove 303 comes into contact with the housing 300 and the bullet 310 in contact with the return spring 320 maintains a state of constantly being in contact with the groove member 250. Thus, the vibration generated by the haptic element 340 may be transmitted to the housing 300, and the vibration transmitted to the housing 300 may be transmitted to the groove member 250.

Accordingly, the vibration transmitted to the groove member 250 is transmitted to the gear shifting knob 210 so that the driver recognizes that the gear shifting operation is performed to the R stage.

As described above, according to an exemplary embodiment of the present disclosure, when the driver performs the gear shifting operation to the R stage, the vibration generated by the haptic element 340 is transmitted to the housing 300, and then the vibration transmitted to the housing 300 is transmitted to the driver through the groove member 250 and the gear shifting knob 210 so that the driver may more clearly recognize that the gear shifting operation is performed to the R stage.

Moreover, because the vibration generated from the haptic element 340 is transmitted to the housing 300 through a gap formation rib 331 instead of the entire internal surface of the element groove 330, a contact area between the haptic element 340 and the housing 300 is reduced. Thus, a vibration transmission structure is optimized by reducing an unnecessary vibration impact and noise caused by an excessive collision between the portions. Thus, the vibration transmitted from the haptic element 340 is efficiently transmitted to the gear shifting knob 210 so that the driver may clearly recognize the vibration. Furthermore, by minimizing the vibration transmitted to the body 100, it is possible to block the vibration transmitted to a steering wheel and minimize an influence on durability of the PCB, and the indicator fixed to the body 100.

Furthermore, the vibration of the haptic element 340 is transmitted in a direction parallel to the grip surface 210a by adjusting the arrangement direction of the haptic element 340 so that the vibration of the haptic element 340 is transmitted as a vibration rubbing the fingers to improve a vibration feeling.

Furthermore, because the haptic element 340 is provided on the side surface of the housing 300, the degree of design freedom of the body may be improved by securing an unused space inside the body 100, miniaturization of the product may be achieved by reducing sizes of the portions, and cost reduction may be achieved.

In accordance with the present disclosure, when a driver performs a gear shifting operation to an R stage, a vibration generated by a haptic element is transmitted to a housing, and the vibration transmitted to the housing is transmitted to the driver through a groove member and a gear shifting knob. Thus, there is an effect of allowing the driver to more clearly recognize that the gear shifting operation is performed to the R stage.

Furthermore, because the vibration generated from the haptic element is transmitted to the housing through ribs instead of the entire internal surface of an element groove, a contact area between the haptic element and the housing may be reduced. Thus, a vibration transmission structure is optimized by reducing an unnecessary vibration impact and noise caused by an excessive collision between the portions. Therefore, there is an effect of allowing the driver to more clearly recognize the vibration transmitted from the haptic element by blocking a vibration transmitted from the steering wheel.

Furthermore, because the vibration of the haptic element is transmitted in a direction horizontal to a grip surface by adjusting an arrangement direction of the haptic element, the vibration of the haptic element is transmitted as a vibration for rubbing fingers so that there is an advantage of improving a vibration feeling.

Furthermore, because the haptic element is provided on a side surface of the housing, there is an effect in that the degree of freedom of design of the body may be improved by securing an unused space inside the body, miniaturization of the product may be achieved by reducing sizes of the portions, and cost reduction may be achieved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A shift-by-wire transmission system, comprising:
   a gear shifting operation portion provided at an end portion of a body and configured to shift a gear;
   a housing provided inside the body;
   a haptic element provided in contact with the housing and configured to generate a vibration when the gear is shifted to a predetermined gear shifting stage to transmit the vibration to the housing;
   a groove member coupled to the gear shifting operation portion, configured to operate in conjunction with a gear shifting operation of the gear shifting operation portion and transmit the vibration of the haptic element, which is transmitted to the housing, to the gear shifting operation portion; and
   a restoration portion elastically supported between the housing and the groove member to be provided in a state of constantly being in contact with therebetween and configured to provide an elastic restoring force for a rotational operation of the groove member according to a rotational gear shifting operation of the gear shifting operation portion.

2. The shift-by-wire transmission system of claim 1, wherein an element groove is formed on the housing, and the haptic element is inserted into the element groove to be in contact with the housing.

3. The shift-by-wire transmission system of claim 2, wherein the element groove is integrally formed on one side of an external circumferential surface of the housing.

4. The shift-by-wire transmission system of claim 2, wherein the haptic element is bonded to a bottom surface of the element groove.

5. The shift-by-wire transmission system of claim 2, wherein a gap formation rib is formed to protrude from a sidewall of the element groove so that the haptic element is supported on the gap formation rib.

6. The shift-by-wire transmission system of claim 2,
   wherein the housing is assembled on a first surface of an internal side of the body,
   wherein an opening is formed at an end portion of the element groove facing a bottom surface of the element groove, and the haptic element is inserted into the opening, and
   wherein an element fixing rib is formed to protrude from a second surface of the internal side of the body toward the end portion of the element groove and support the haptic element.

7. The shift-by-wire transmission system of claim 1, wherein the housing is formed in a shape of cylinder and coupled to an internal surface of the body by an engagement member.

8. The shift-by-wire transmission system of claim 1, wherein a housing support rib is formed on an internal surface of the body facing the housing to support an external surface of the housing.

9. The shift-by-wire transmission system of claim 1, further including:
   a gear shifting knob provided at the end portion of the body as the gear shifting operation portion and rotated about an axis of the body,
   wherein the groove member is inserted into and coupled to inside of the gear shifting knob.

10. The shift-by-wire transmission system of claim 9, wherein a hook is formed on an external surface of the groove member, and a hook groove including a shape corresponding to the hook is formed on an internal surface of the gear shifting knob so that the groove member is engaged with the gear shifting knob by snap-fitting between the hook and the hook groove.

11. The shift-by-wire transmission system of claim 9, wherein a position fixing rib is formed to protrude from an internal surface of the gear shifting knob in an axial direction of the body, and a position fixing groove including a shape corresponding to the position fixing rib is formed on an external surface of the groove member so that the position fixing rib is inserted into the position fixing groove.

12. The shift-by-wire transmission system of claim 1, wherein the restoration portion includes:

a gear shifting groove formed at an end portion of the groove member along a path in which the groove member is rotated;
   a bullet groove formed in the housing;
   a bullet movably inserted into the bullet groove and supported on the gear shifting groove; and
   a return spring configured to provide an elastic restoring force to the bullet in a direction toward the gear shifting groove.

13. The shift-by-wire transmission system of claim 12, wherein the return spring is in contact with the housing, the bullet in contact with the return spring maintains a state of constantly being in contact with the groove member, the vibration generated from the haptic element is transmitted to the housing, and the vibration transmitted to the housing is transmitted to the groove member by the restoration portion.

14. The shift-by-wire transmission system of claim 12,
   wherein the bullet groove is formed in an axial direction of the body so that an opening of the bullet groove is formed to face the gear shifting groove, and
   wherein the return spring is supported between an end portion of an internal side of the bullet groove and the bullet.

15. The shift-by-wire transmission system of claim 1, wherein an end portion of the housing is inserted into an end portion of the groove member with a gap at a level capable of transmitting the vibration so that the vibration generated from the haptic element is transmitted from the housing to the groove member.

16. The shift-by-wire transmission system of claim 1, wherein a cylindrical housing insertion portion is formed at one end portion of the housing toward the groove member, and a cylindrical groove insertion portion is formed at one end portion of the groove member toward the housing so that an external circumferential surface of the housing insertion portion is inserted into an internal circumferential surface of the groove insertion portion with a gap.

17. The shift-by-wire transmission system of claim 1,
   wherein a grip surface configured to be held by fingers during a gear shifting operation is formed on a surface of the gear shifting operation portion, and
   wherein the haptic element is disposed so that the vibration generated from the haptic element is transmitted in a direction horizontal to the grip surface.

18. The shift-by-wire transmission system of claim 17,
   wherein the grip surface is formed in a direction parallel to an axial direction of the body,
   wherein a vibrating surface formed on a side surface of the haptic element is in contact with the housing to transmit the vibration, and
   wherein the vibrating surface is disposed in a direction parallel to the axial direction of the body and in a direction perpendicular to the grip surface.

* * * * *